US006955629B2

(12) United States Patent
Nishida et al.

(10) Patent No.: US 6,955,629 B2
(45) Date of Patent: Oct. 18, 2005

(54) SHIFT CONTROL APPARATUS FOR AN AUTOMATIC TRANSMISSION

(75) Inventors: Masaaki Nishida, Anjo (JP); Hiroshi Tsutsui, Anjo (JP); Kouichi Kojima, Anjo (JP); Yutaka Teraoka, Anjo (JP); Masatake Ichikawa, Anjo (JP); Hidekazu Funakoshi, Anjo (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 0 days.

(21) Appl. No.: 10/404,315

(22) Filed: Apr. 2, 2003

(65) Prior Publication Data

US 2003/0220170 A1 Nov. 27, 2003

(30) Foreign Application Priority Data

May 20, 2002 (JP) ....................................... 2002-144889

(51) Int. Cl.[7] ................................................ F16H 61/04
(52) U.S. Cl. ....................................................... 477/143
(58) Field of Search ................................ 475/127, 128; 477/130, 143, 149, 156

(56) References Cited

U.S. PATENT DOCUMENTS 5,961,422 A * 10/1999 Yasue et al. ................ 477/143
6,270,444 B1 * 8/2001 Tsutsui et al. .............. 477/143
6,626,786 B2 * 9/2003 Hayabuchi et al. ......... 475/127
6,712,735 B2 * 3/2004 Hayabuchi et al. ......... 477/120
2002/0086760 A1 7/2002 Hayabuchi et al.
2002/0086761 A1 7/2002 Hayabuchi et al.

FOREIGN PATENT DOCUMENTS

JP 02000337500 A * 12/2000

* cited by examiner

*Primary Examiner*—Roger Pang
(74) *Attorney, Agent, or Firm*—Sughrue Mion, PLLC

(57) ABSTRACT

A shift control apparatus has first, second, third and fourth engagement elements, and a shift control processing unit engaging the first and the second engagement elements in order to realize a first shift speed, engaging the third and the fourth engagement in order to realize a second shift speed, and inhibiting an increase in torque capacity of one of the first and second engagement elements before starting of release of the second engagement element when shifting from the first to the second shift speed. During shifting from the first to the second shift speed, an increase in torque capacity of one of the first and second engagement elements is inhibited before starting of release of the second engagement element. This prevents a step-like shift shock from being caused by the slowed progression of shifting when release of the second engagement element is started.

16 Claims, 16 Drawing Sheets

| | C1 | C2 | C3 | B1 | B2 | B3 | F1 | F2 |
|---|---|---|---|---|---|---|---|---|
| P | | | | | | | | |
| R | | | ○ | | | ○ | | |
| N | | | | | | | | |
| 1st | ○ | | | | | △ | | ○ |
| 2nd | ○ | | | △ | ○ | | ○ | |
| 3rd | ○ | | ○ | | ● | | | |
| 4th | ○ | ○ | | | ● | | | |
| 5th | | ○ | ○ | | ● | | | |
| 6th | | ○ | | ○ | ● | | | |

FIG. 3

SHIFT CONTROL APPARATUS FOR AN AUTOMATIC TRANSMISSION

INCORPORATION BY REFERENCE

The disclosure of Japanese Patent Application No. 2002-144889 filed on May 20, 2002 including the specification, drawings and abstract is incorporated herein by reference in its entirety.

BACKGROUND OF THE INVENTION

1. Field of the Invention

The present invention relates to a shift control apparatus for an automatic transmission.

2. Description of the Related Art

In conventional automatic transmissions, a power transmission route in a shift device including a planetary gear unit is switched by means of engagement/release of engagement elements, in order to change a gear ratio for producing a plurality of shift speeds. When upshifting or downshifting in order to realize a specific shift speed, for the purpose of simplification of the engagement/release of the engagement elements and inhibiting of shift shock, another engagement element is additionally engaged, or a predetermined engagement element under engagement is released, with respect to the existing engagement of a plurality of engagement elements or a single engagement element. Due to the structure of the gear train constituting the shift device, when unavoidable, a change over operation for an engagement element that engages another engagement elements is executed, while an engagement element under engagement is released.

Recently, there has been a tendency to increase the number of speeds of the automatic transmission in order to improve drivability and enhance fuel economy. For this purpose, an over-drive gear or an under-drive gear is typically incorporated in a shift device including a plurality of planetary gear units. By doing so, a shift speed serving as an acceleration or a deceleration speed is added.

Further, an automatic transmission achieving multiple speeds by means of splitting an input to a Ravigneaux type planetary gear set into a high-low dual system has been disclosed (see Laid-open Japanese Patent Application No. Hei.4-219553).

However, such conventional automatic transmissions require a complicated multiple change over operation for four engagement elements instead of the simple change over operation for two engagement elements, because of the wide selection of shift speeds to match a running condition of a vehicle. Examples of the need to execute the multiple change over operation for the four engagement elements include shifting from a predetermined shift speed to a specific shift speed without involving the shift speed adjacent thereto, namely, a "jump shift".

In the multiple change over operation, a way of controlling the order, timing and the like, in which the individual engagement elements are engaged and/or released is of extreme importance. If the engagement elements are not engaged/released in the correct order and with the proper timing, and the like, a smooth shift cannot be achieved, and therefore shift continuousness is impaired. As a result, problems result such as the occurrence of step-like shocks during shifting, with a particularly substantial shock at the completion of shifting, or alternatively, the time required for shifting becomes longer than desired.

SUMMARY OF THE INVENTION

It is an object of the present invention to solve the problems associated with the conventional automatic transmissions as described above, and to provide a shift control apparatus for an automatic transmission which is capable of preventing shift shock.

Therefore, a shift control apparatus for an automatic transmission according to an aspect of the present invention has: a first engagement element; a second engagement element; a third engagement element; a fourth engagement element; and a shift control processing unit causing engagement of the first engagement element and engagement of the second engagement element for achieving a first shift speed, causing engagement of the third engagement element and engagement of the fourth engagement element for achieving a second shift speed, and inhibiting an increase in a torque capacity of one of the first and second engagement elements before starting release of the second engagement element, when shifting from the first shift speed to the second shift speed is performed.

In this case, during shifting from the first shift speed to the second shift speed, the increase in the torque capacity of one of the first and second engagement elements is inhibited before starting release of the second engagement element. This design prevents a step-like shift shock from being caused by delayed progression of shifting when release of the second engagement element is started.

The shift control apparatus for the automatic transmission according to a further aspect of the invention may be structured such that the shift control processing unit includes a first hydraulic pressure control processing unit stopping a feedback control for a first servo hydraulic pressure in the first engagement element, during a time period from starting a decrease of a second servo hydraulic pressure in the second engagement element to starting release of the second engagement element.

In this case, during a period from starting the decrease of the second servo hydraulic pressure in the second engagement element to starting release of the second engagement element, a feedback control for the first servo hydraulic pressure in the first engagement element is stopped, to prevent an increase of the first servo hydraulic pressure until the first shift is completed. Accordingly, a step-like shift shock is prevented from occurring during shifting because of an extremely large torque capacity of the first engagement element.

The shift control apparatus for the automatic transmission according to a further aspect of the invention may be structured such that the shift control processing unit includes a second hydraulic pressure control processing unit increasing a third servo hydraulic pressure in the third engagement element for completion of engagement of the third engagement element, when a predetermined time period has elapsed since starting release of the second engagement element.

The shift control apparatus for the automatic transmission according to a further aspect of the invention may be structured such that the second hydraulic pressure control processing unit decreases the third servo hydraulic pressure to a level lower than a hydraulic pressure allowing starting of engagement of the third engagement element, from a time point which is a predetermined time period earlier than the starting of the release of the second engagement element.

In this case, shift shock is more reliably prevented because the third servo hydraulic pressure is decreased before a shift index value exceeds a threshold value.

The shift control apparatus for the automatic transmission according to a further aspect of the invention may be structured such that the shift control processing unit includes a third hydraulic pressure control processing unit decreasing a second servo hydraulic pressure in the second engagement element to an initial value for starting engagement of the second engagement element, when release of the second engagement element is started.

In this case, a shift shock is further reliably prevented because the second servo hydraulic pressure for engagement of the second engagement element is decreased when the shift index value exceeds the threshold value.

The shift control apparatus for the automatic transmission according to a further aspect of the invention may be structured such that the aforementioned initial value is set lower than an initial value set when shifting from a third shift speed to the second shift speed is performed during a constant speed running of a vehicle.

In this case, setting the aforementioned initial value lower than the initial value set, when shifting from the third shift speed to the second shift speed is performed during a constant speed running of the vehicle, allows an immediate change of an input rotational speed along with starting of the second shift.

Further, it is possible to decrease the torque capacity of the second engagement element while a gear ratio exceeds fourth speed. Hence, when the third engagement element is engaged along with starting of the second shift, shift shock is inhibited.

The shift control apparatus for the automatic transmission according to a further aspect of the invention may be structured such that the shift control processing unit includes a fourth hydraulic pressure processing unit that decreases, after a fast-fill process is performed, a fourth servo hydraulic pressure for engagement of the fourth engagement element to a level slightly lower than a stroke pressure for release of the fourth engagement element. The fourth hydraulic pressure processing unit then changes the fourth servo hydraulic pressure to a piston stroke pressure.

The shift control apparatus for the automatic transmission according to a further aspect of the invention may be structured such that the shift control processing unit starts release of the second engagement element after starting release of the first engagement element, and completes engagement of the fourth engagement element after completing engagement of the third engagement element.

The shift control apparatus for the automatic transmission according to a further aspect of the invention may be structured such that the shift control processing unit starts release of the second engagement element before completion of engagement of the third engagement element.

The shift control apparatus for the automatic transmission according to a further aspect of the invention may be structured such that the shift control processing unit starts release of the second engagement element while executing release of the first engagement element and engagement of the third engagement element.

The shift control apparatus for the automatic transmission according to a further aspect of the invention may be structured such that the shift control processing unit causes engagement of the second engagement element and engagement of the third engagement element to achieve the third shift speed.

The shift control apparatus for the automatic transmission according to a further aspect of the invention may be structured such that the shift control processing unit establishes a third shift speed between the first shift speed and the second shift speed, performs a first shift from the first shift speed to the third shift speed, and starts release of the second engagement element when a gear ratio of the third shift speed is achieved.

The shift control apparatus for the automatic transmission according to a further aspect of the invention may be structured such that the shift control processing unit includes a shift index calculation processing unit that calculates a shift index value representing a progressing state of shifting, and determines that the gear ratio of the third shift speed is achieved when the shift index value is higher than a threshold value.

BRIEF DESCRIPTION OF THE DRAWINGS

FIG. 3 is a table showing an operation of the automatic transmission according to the embodiment of the present invention;

DETAILED DESCRIPTION OF THE PREFERRED EMBODIMENTS

A preferred embodiment according to the present invention will be described below in detail with reference to the accompanying drawings.

Figure 1:
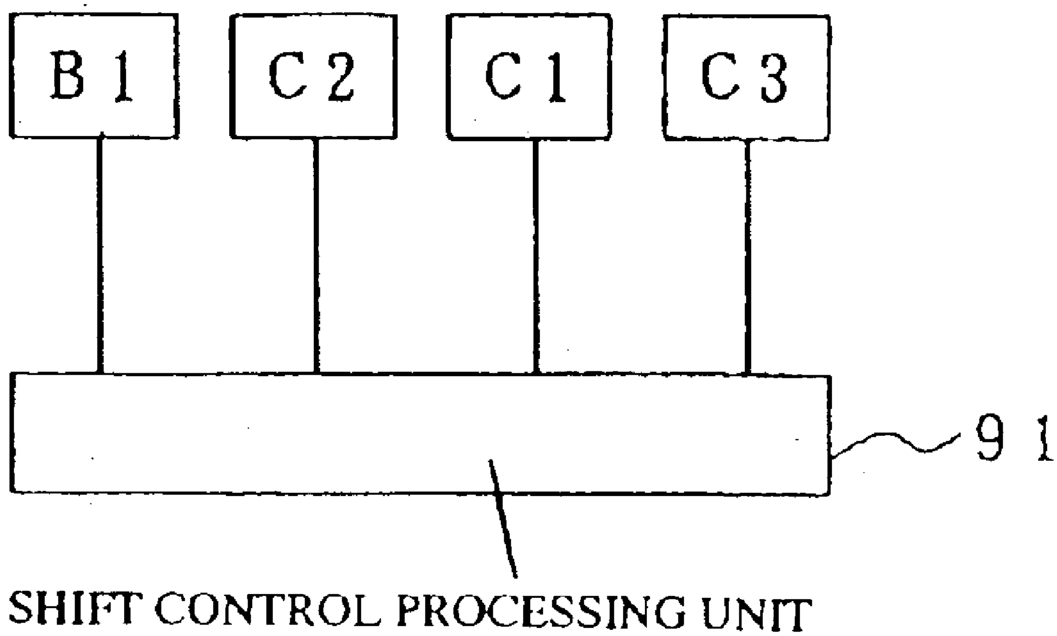
FIG. 1 is a function block diagram of a shift control apparatus for an automatic transmission according to an embodiment of the present invention.

FIG. 1 is a function block diagram of a shift control apparatus for an automatic transmission according to an embodiment of the present invention.

In FIG. 1, reference symbols B1, C2, C1 and C3, denotes a brake serving as a first engagement element, a clutch serving as a second engagement element, a clutch serving as a third engagement element and a clutch serving as a fourth engagement element, respectively. Reference numeral 91 denotes a shift control processing unit. The shift control processing unit 91 causes engagement of the brake B1 and the clutch C2 in order to realize a first shift speed, and engagement of the clutches C1 and C3 to realize a second shift speed. When shifting from the first shift speed to the second shift speed, the shift control processing unit 91 inhibits an increase in the torque capacity of one or other of the brake B1 and the clutch C2, before starting release of the clutch C2.

Figure 2:
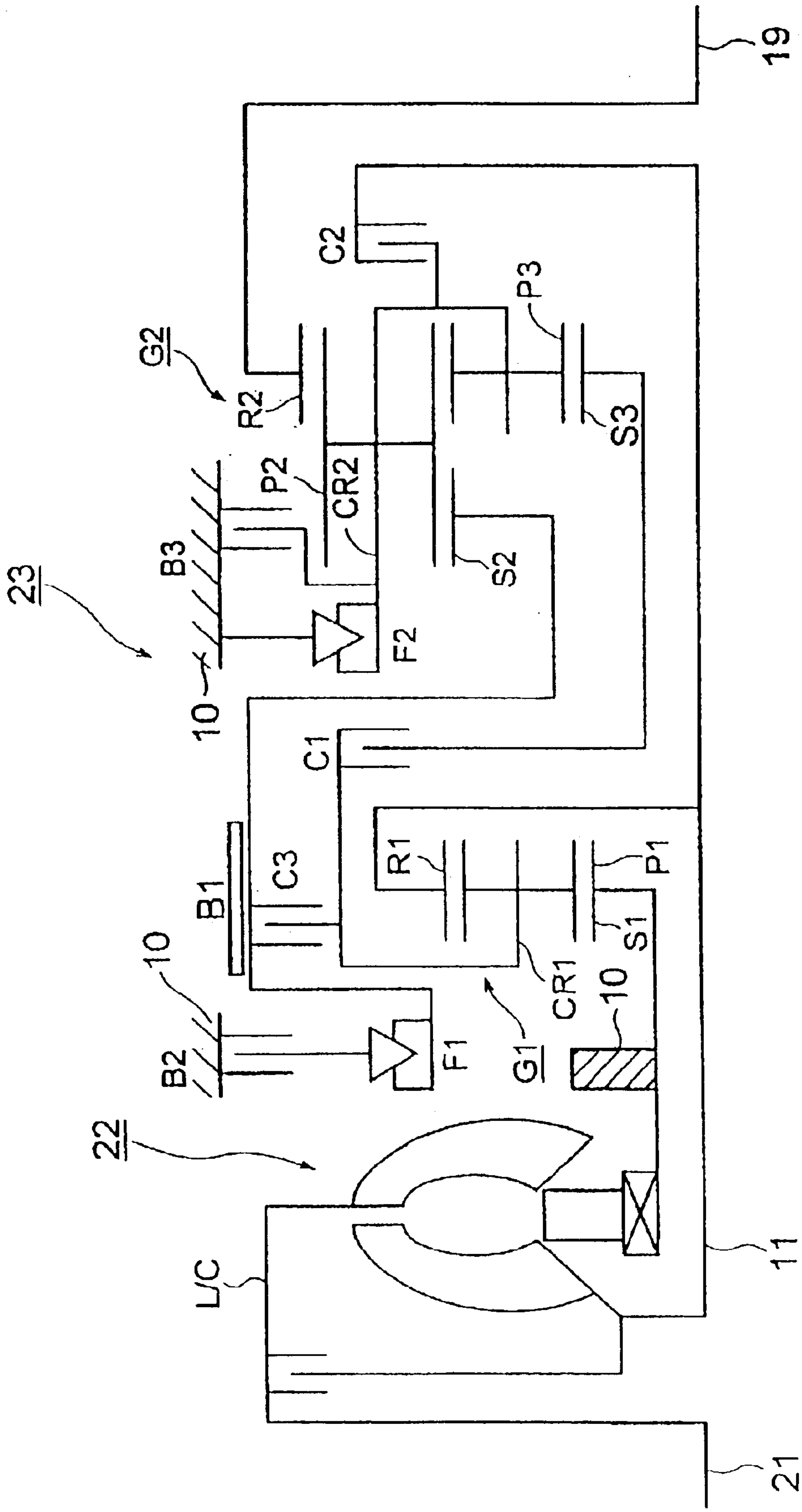
FIG. 2 is a schematic outline view of the automatic transmission according to the embodiment of the present invention.
Figure 4:
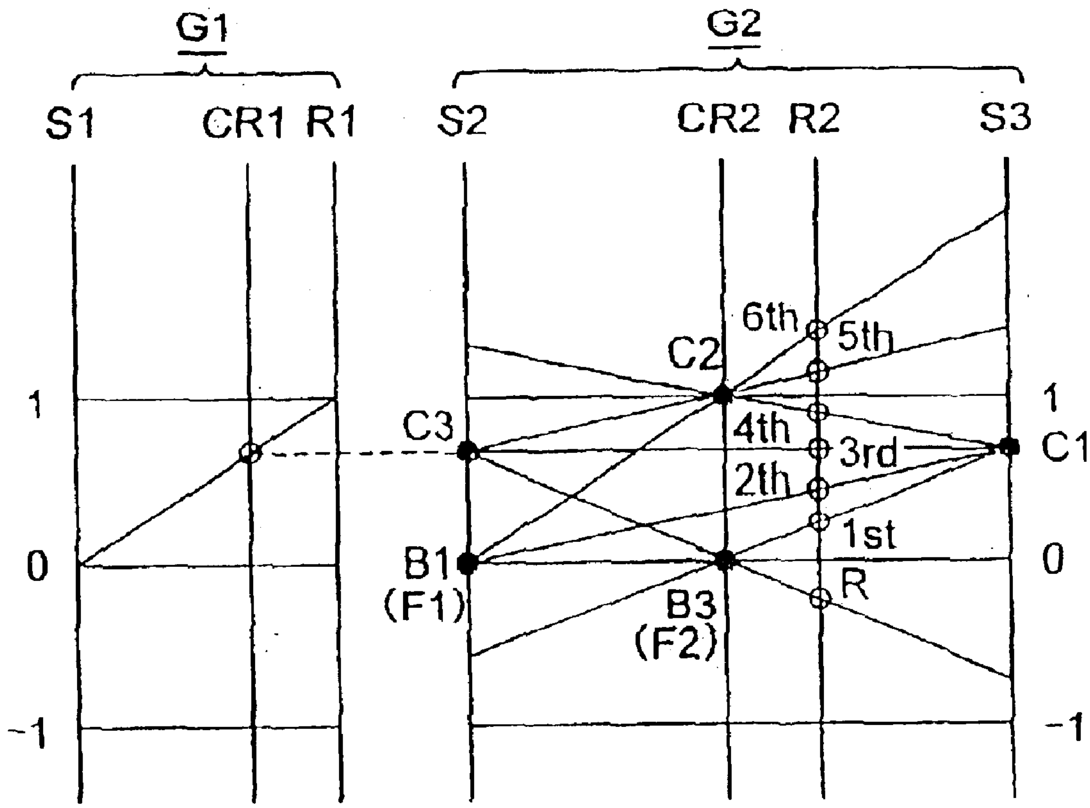
FIG. 4 is a speed chart according to the embodiment of the present invention.

FIG. 2 is a schematic outline view of the automatic transmission according to the embodiment of the present invention, FIG. 3 is a table showing an operation of the automatic transmission, and FIG. 4 is a speed chart.

In FIG. 2, reference numeral 21 denotes an output shaft connected to a crank shaft of an engine (not shown). The rotation generated by the engine is transmitted to a torque converter 22 via the output shaft 21. The torque converter 22 transfers the rotation from the engine to an input shaft 11 using oil as a fluid. When the vehicle speed exceeds a set value, a lockup clutch L/C is engaged, so that it is possible to transmit rotation directly to the input shaft 11.

The input shaft 11 is connected to a shift device 23. This shift device 23 is designed for FR-type vehicles and executes shifting between six forward speeds and one reverse speed. The shift device 23 has a gear train formed from a combination of a planetary gear unit GI, serving as a simple planetary-type reduction gear, and a Ravigneaux-type planetary gear unit G2 forming the nucleus of the shift device 23.

The planetary gear unit G1 is provided with a sun gear S1, a ring gear R1, a pinion gear P1 that meshes externally with the sun gear S1 and also meshes internally with the ring gear R1, and a carrier CR1 supporting the pinion gear P1. The sun gear S1, the ring gear R1 and the carrier CR1 each constitute a gear element The planetary gear unit G2 includes: large-diameter and small-diameter sun gears S2 and S3, which have different diameters; a ring gear R2; a long pinion gear P2 serving as a first pinion gear and meshing externally with the sun gear S2 and also meshing internally with the ring gear R2; a short pinion gear P3 serving as a second pinion gear and meshing externally with the sun gear S3 and the long pinion gear P2; and a carrier CR2 supporting both the long pinion gear P2 and the short pinion gear P3. The sun gears S2 and S3, the ring gear R2 and the carrier CR2 each constitute a gear element.

The ring gear R1 serving as an input element is connected to the input shaft 11. The carrier CR1 serving as an output element is connected with both the sun gear S3 via the clutch C1 and the sun gear S2 via the clutch C3. The sun gear S1 serving as a stationary element generating a reaction force is fixed to a transmission case 10.

The sun gear S2 is connected to the transmission case 10 via the clutch C3 and the brake B1, which is constituted by a band brake. Furthermore, the sun gear S2 is also connected to the transmission case 10 via a one-way clutch F1, disposed parallel to the clutch C3, and a brake B2. The carrier CR2 is connected to the input shaft 11 via the clutch C2, and to the transmission case 10 via a brake B3. The carrier CR2 is arranged such that it is prevented from rotating in one direction with respect to the transmission case 10 by a one-way clutch F2. Moreover, the ring gear R2 is connected to an output shaft 19.

It should be noted that, the clutches C1 to C3 and the brakes B2 and B3 form a multiple plate-type engagement element including a plurality of friction plates. The brake B1 forms a band-type engagement element including a brake drum and a band.

As shown in FIG. 3, the clutches C1 to C3, the brakes B1 to B3 and the one-way clutches F1 and F2 are engaged or released in order to set a range for realizing a shift speed. In FIG. 3, a ○ symbol represents engagement, a Δ symbol represents engagement when utilizing engine-brake, a • symbol represents engagement that does not have any direct influence on the realization of the shift speed, and a blank space indicates release. Furthermore, the letter P represents a parking range, the letter R represents a reverse range, the letter N represents a neutral range, and 1st, 2nd, 3rd, 4th, 5th, and 6th represent, respectively, a first speed to a sixth speed in the forward range.

FIG. 4 shows, for each shift speed, a preset rotational speed ratio of the sun gear S1, the ring gear R1 and the carrier CR1 of the planetary gear unit G1, respectively, and a present rotational speed ratio of the sun gears S2 and S3, carrier CR2 and ring gear R2 of the planetary gear unit G2, the clutches C1 to C3, the brakes B1 and B3, and the one-way clutches F1 and F2, respectively.

In the first speed in the forward range, the clutch C1 and the one-way clutch F2 are engaged. At this point, the one-way clutch F2 is automatically engaged instead of engaging the brake B3.

This automatic engagement is executed in order for the brake B3 to be released, without a complicated hydraulic control, during the change over operation for the brakes B3 and B1 which is performed when shifting from the first speed to the second speed, i.e., in a 1st to 2nd upshift, which will be described later. In other words, upon engagement of the brake B1 in the 1st to 2nd upshift, the one-way clutch F2 is automatically released.

In the first speed, the rotation, which is input from the input shaft 11 and decelerated by the planetary gear unit GI, is input to the sun gear S3 via the clutch C1. The carrier CR2 receives a reaction force generated along with engagement of the one-way clutch F2 and comes to a stop. Then, the rotation decelerated at a maximum reduction gear ratio is output from the ring gear R2 to the output shaft 19.

In the second speed, the clutch C1 and the one-way clutch F1 are engaged, and the brake B2 is engaged in order to make the engagement of the one-clutch F1 effective. The one-way clutch F1 and the brake B2 are engaged instead of the brake B1.

In this event, the rotation, which is input from the input shaft 11 and decelerated via the planetary gear unit G1, is input to the sun gear S3 via the clutch C1. The sun gear S2 receives a reaction force generated in association with engagement of the brake B2 and the one-way clutch F1 and comes to a stop. Then the rotation decelerated is output from the ring gear R2 to the output shaft 19. At this time, the rotational speed ratio is larger than that in the first speed and the reduction ratio is smaller than that in the first speed, as shown in FIG. 4.

In the third speed, the clutches C1 and C3 are engaged. In this event, the planetary gear unit G2 enters a direct connection state, so that the rotation input from the input shaft 11 and decelerated via the planetary gear unit G1 is input simultaneously to the sun gears S2 and S3, via the clutches C1 and C3. A rotation that is the same as that input to the sun gears S2 and S3 is output from the ring gear R2 to the output shaft 19, as a rotation decelerated with respect to the rotation of the input shaft 11.

In the fourth speed, the clutches C1 and C2 are engaged. In this event, on one hand, the rotation input from the input shaft 11 and decelerated through the planetary gear unit G1 is input to the sun gear S3 via the clutch C1. On the other hand, the rotation input from the input shaft 11 via the clutch C2 without being decelerated is input to the carrier CR2. A rotation that is intermediate between the two input rotations, as a rotation slightly decelerated with respect to the rotation of the input shaft 11, is output from the ring gear R2 to the output shaft 19.

In the fifth speed, the clutches C2 and C3 are engaged. In this event, on one hand, the rotation input from the input shaft 11 and decelerated through the planetary gear unit G1 is input to the sun gear S2 via the clutch C3. On the other hand, the rotation input from the input shaft 11 via the clutch C2 that is not decelerated is input to the carrier CR2. A rotation that is slightly accelerated with respect to that of the input shaft 11 is output from the ring gear R2 to the output shaft 19.

In the sixth speed, the clutch C2 and the brake B1 are engaged. In this event, the rotation input from the input shaft 11 via the clutch C2 that is not decelerated is input to the carrier CR2. The sun gear S2 receives a reaction force generated along with the engagement of the brake B1 and comes to a stop. Accordingly, a rotation that is further accelerated is output from the ring gear R2 to the output shaft 19.

In the reverse range, the clutch C3 and the brake B3 are engaged. In this event, the rotation input from the input shaft 11 and decelerated via the planetary gear unit GI is input via the clutch C3 to the sun gear S2. The carrier CR2 receives a reaction force generated by the engagement of the brake B3 and comes to a stop. Thus, a rotation in the reverse direction is output from the ring gear R2 to the output shaft 19.

Next, a description of the relationship between the one-way clutch F1 and the brakes B1 and B2 will be given. A direction of engagement of the one-way clutch F1 connected with the sun gear S2 is set so as to apply a reaction force to the sun gear S2 in the second speed. The one-way clutch F1 substantially performs the same function as the engagement of the brake B1. Unlike the carrier CR2, the sun gear S2 is engaged not only in order for engine braking to be effective in the second speed, but also in order to realize the sixth speed. For this reason, for realizing the second speed, engagement of the brake B1 is required along with engagement of the sun gear S2.

As is clearly apparent from the speed chart in FIG. 4, the sun gear S2 is rotated in the direction opposite to that of the rotation input in first speed. This rotation is in the same direction as that of the rotation input in each shift speed from the third speed upwards. For this reason, it is impossible to directly connect the one-way clutch F1 to the transmission case 10. Hence, the one-way clutch F1 is connected in-series to the brake B2, and the sun gear S2 is connected to the transmission case 10 via the one-way clutch F1 and the brake B2.

In each shift speed realized in this way, as is qualitatively apparent by referring to an up-down distance between the ○ symbols representing the rotational speed ratio of the ring gear R2, from the speed chart in FIG. 4, it is possible to obtain satisfactory speed steps having relatively regular intervals between the respective shift speeds. In the shift device 23 structured as described above, normal shifting to a lower or an upper gear between adjacent shift speeds does not require the multiple change over operation of the engagement elements. However, the multiple change over operation of engagement elements is required for executing a jump shift. For example, a shift from the sixth speed to the third speed, i.e., a 6th to 3rd downshift, or a shift from the fifth speed to the second speed, i.e., a 5th to 2nd downshift, and the like.

However, during the 5th to 2nd downshift, the brake B2 is engaged at all times in all shift speed from the second speed and above for simplification of control. Accordingly, the one-way clutch F1 is automatically engaged, and together with the brake B2 performs the same function as engagement of the brake B1.

Next, a description of an automatic transmission control apparatus for controlling the automatic transmission described above will be given.

Figure 5:
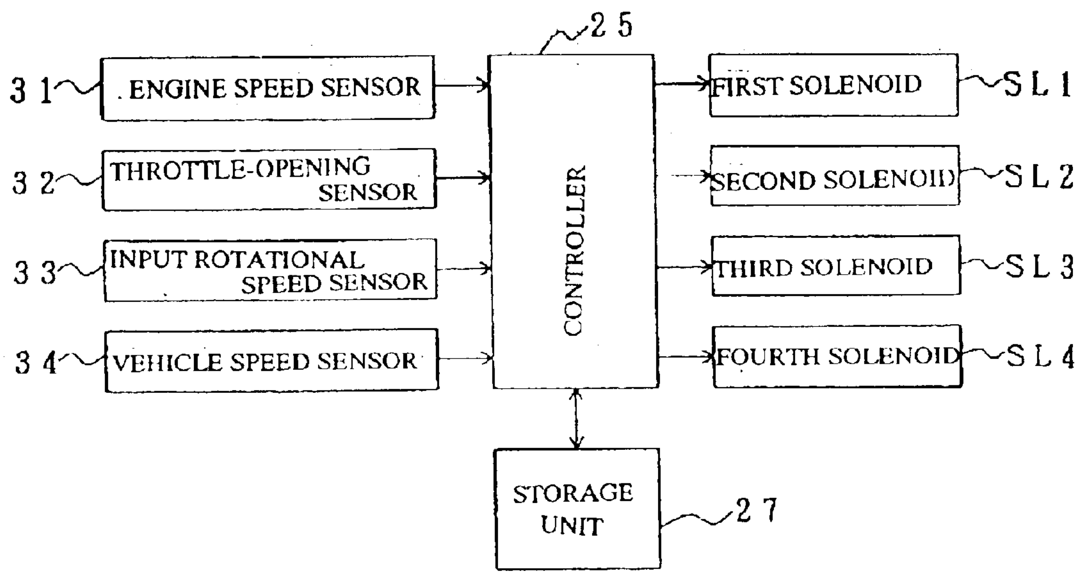
FIG. 5 is a block diagram of an automatic transmission control apparatus according to the embodiment of the present invention.

FIG. 5 is a block diagram of the automatic transmission control apparatus according to the embodiment of the present invention.

In FIG. 5, reference numeral 25 denotes a controller including a CPU, an MPU, and the like, which are not shown in FIG. 5. This controller 25 functions as a computer on the basis of a predetermined program, data, or the like. The controller 25 is connected to sensors functioning as an input portion for inputting information about various controls. Examples of the sensors which are connected to the controller 25 are: an engine speed sensor 31 serving as an engine speed detection portion for detecting an engine speed of the vehicle; a throttle-opening sensor 32 serving as an engine load detection portion for detecting a degree of throttle opening representing the engine load; an input rotational speed sensor 33 serving as an input rotational speed detection portion for detecting a rotational speed of the input shaft 11 (see FIG. 2), i.e., an input rotational speed Ni of the shift device 23; a vehicle speed sensor 34 serving as a vehicle speed detection portion for detecting an output rotational speed No of the shift device 23 represented by the rotational speed of the output shaft 19, and detecting a vehicle speed representing the running condition of the vehicle, based on the output rotational speed No; and other sensors. The controller 25 is also connected to an actuator functioning as an output portion for outputting a drive signal, on the basis of the control information. This actuator may be, for example, first to fourth solenoids SL1 to SL4.

The controller 25 is connected to a storage unit 27 in which the shift map, and the like, as well as the program, the data, and the like, are stored.

Next, a description will be given of a hydraulic circuit of the automatic transmission structured as described above.

Figure 6:
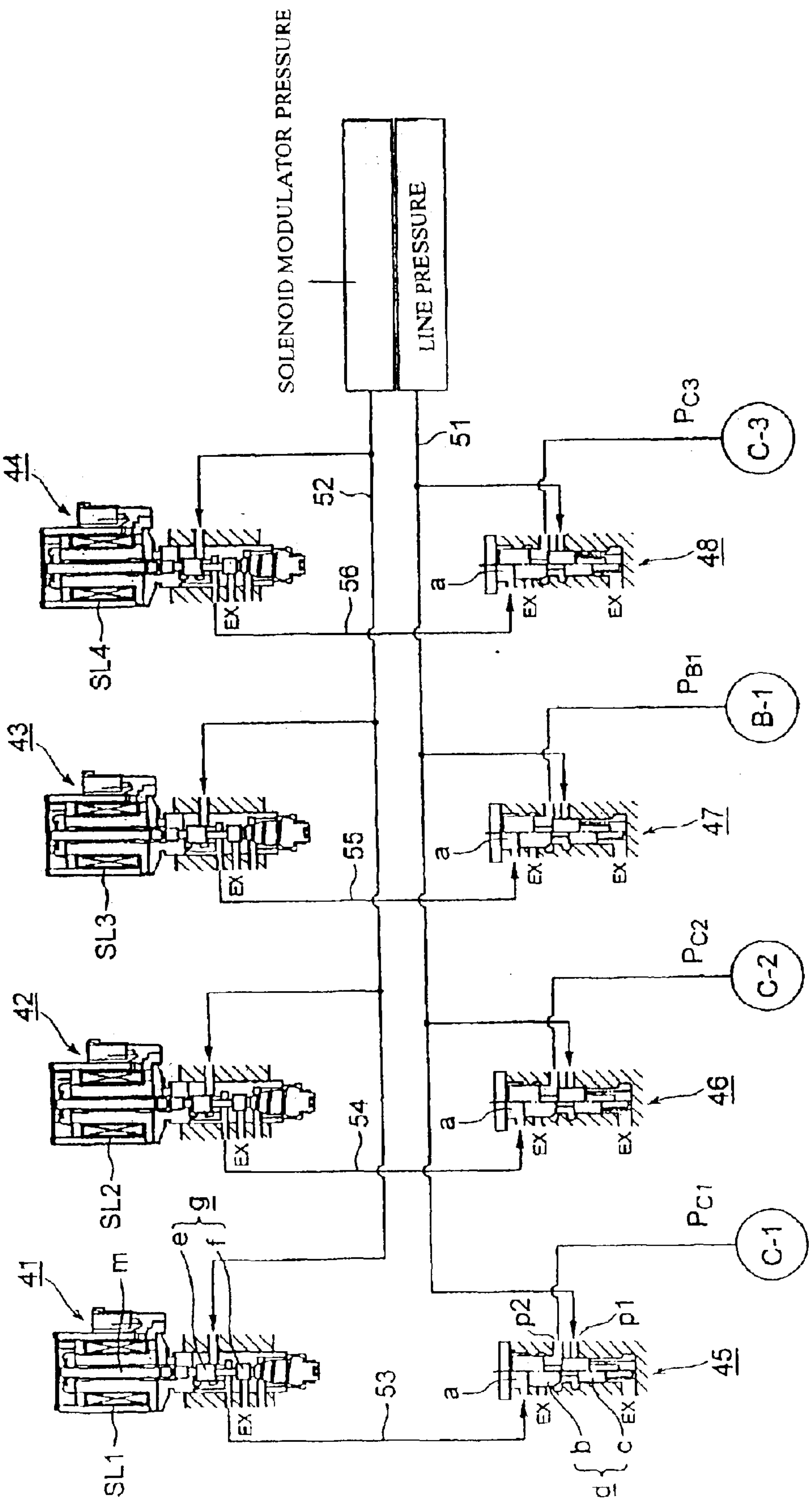
FIG. 6 is a diagram illustrating main elements of a hydraulic circuit according to the embodiment of the present invention.

FIG. 6 is a diagram illustrating main members of the hydraulic circuit according to the embodiment of the present invention.

In FIG. 6, reference numeral 51 denotes a line pressure hydraulic passage for supplying a line pressure $P_L$. The line pressure hydraulic passage is connected in-series to a C-1 control valve 45, a C-2 control valve 46, a B-1 control valve 47 and a C-3 control valve 48. The line pressure $P_L$ indicates a maximum hydraulic pressure for maintaining the clutches C1 to C3 and the brakes B1 to B3 in an engaged state in accordance with a running load of the vehicle. Reference numeral 52 denotes a solenoid modulator pressure hydraulic passage for supplying a solenoid modulator pressure. The solenoid modulator pressure hydraulic passage 52 is connected in-series to each of the solenoid valves 41 to 44. The solenoid modulator pressure is generated by using a modulator valve (not shown) to reduce the line pressure $P_L$ in order to increase the pressure control gain in each of the solenoid valves 41 to 44.

A hydraulic servo C-1 provided for engagement/release of the clutch C1 is connected to the line pressure hydraulic passage 51 via the C-1 control valve 45. The C-1 control valve 45 has a control hydraulic chamber "a" connected to the solenoid modulator pressure hydraulic passage 52, via a hydraulic passage 53 and the solenoid valve 41. This control hydraulic chamber "a" is applied with a solenoid signal pressure generated by the solenoid valve 41.

The C-1 control valve 45 has a spool "d" including lands "b" and "c," which have different diameters, formed at either end. The solenoid signal pressure is applied to an end face of the large-diameter land "b" in opposition to a spring load applied to an end face of the small-diameter land "c," whereupon the land "b" moves to close a drain port EX. Along with this, the line pressure hydraulic passage 51 and the hydraulic servo C-1 communicate with each other while the land "c" reduces the area between an in-port p1 communicating with the line pressure hydraulic passage 51 and an out-port p2 communicating with the hydraulic servo C-1. As a result, a predetermined C-1 servo hydraulic pressure $P_{C1}$ is generated as a first servo hydraulic pressure, and is applied to the hydraulic servo C-1 for engagement/release of the clutch C1.

When application of the solenoid signal pressure to the control hydraulic chamber "a" of the C-1 control valve 45 stops, the land "c" closes the in-port p1 and the land "b" opens the drain port EX, so that the C-1 servo hydraulic pressure $P_{C1}$is drained from the hydraulic servo C-1.

On the other hand, the solenoid valve 41 is structured by a normally-open type linear solenoid valve and has a spool "g" including lands "e" and "f" formed at either end. When the first solenoid SL1 is driven to apply a load to a plunger "m" in opposition to a spring load applied to an end face of the spool "g," constriction between the solenoid modulator pressure hydraulic passage 52 and a hydraulic passage 53 is adjusted. Accordingly, an amount of hydraulic fluid drained from the hydraulic passage 53 is adjusted. As a result, the solenoid signal pressure is generated in accordance with a drive signal supplied to the first solenoid SL1, and applied to the C-1 control valve 45 via the hydraulic passage 53.

Likewise, a hydraulic servo C-2 provided for engagement/release of the clutch C2 is connected to the line pressure hydraulic passage 51 via the C-2 control valve 46. This hydraulic servo C-2 has the same structure as that of the C-1 control valve 45. The C-2 control valve 46 has a control hydraulic chamber "a" connected to the solenoid modulator pressure hydraulic passage 52 via a hydraulic passage 54, and a solenoid valve 42 which has the same structure as that of the solenoid valve 41. The solenoid valve 42 generates a solenoid signal pressure in accordance with a drive signal supplied to the second solenoid SL2, and applies it to the C-2 control valve 46 via the hydraulic passage 54. As a result, in the C-2 control valve 46, a predetermined C-2 servo hydraulic pressure PC2 is generated as a second servo hydraulic pressure and supplied to the hydraulic servo C-2 provided for engagement/release of the clutch C2.

A hydraulic servo B-1 provided for engagement/release of the brake B1 is connected to the line pressure hydraulic passage 51 via the B-1 control valve 47 which has the same structure as that of the C-1 control valve 45. The B-1 control valve 47 has a control hydraulic chamber "a" connected to the solenoid modulator pressure hydraulic passage 52 via a hydraulic passage 55 and a solenoid valve 43 which has the same structure as that of the solenoid valve 41. The solenoid valve 43 generates a solenoid signal pressure in accordance with a drive signal supplied to the third solenoid SL3, and applies it to the B-1 control valve 47 via the hydraulic passage 55. As a result, in the B-1 control valve 46, a predetermined B-1 servo hydraulic pressure $P_{B1}$ is generated as a third servo hydraulic pressure and supplied to the hydraulic servo B-1 provided for engagement/release of the brake B1.

A hydraulic servo C-3 provided for engagement/release of the clutch C3 is connected to the line pressure hydraulic passage 51 via the C-3 control valve 48 which has the same structure as that of the C-1 control valve 45. The C-3 control valve 48 has a control hydraulic chamber "a" connected to the solenoid modulator pressure hydraulic passage 52 via a hydraulic passage 56 and a solenoid valve 44 which has the same structure as that of the solenoid valve 41. The solenoid valve 44 generates a solenoid signal pressure in accordance with a drive signal supplied to the fourth solenoid SL4, and applies this solenoid signal pressure to the C-3 control valve 48 via the hydraulic passage 56. As a result, in the C-3 control valve 48, a predetermined C-3 servo hydraulic pressure $P_{C3}$ is generated as a fourth servo hydraulic pressure and supplied to the hydraulic servo C-3 for engaging/disengaging the clutch C3. Note that, reference letters EX in FIG. 6 denote a drain port provided in each valve.

As an example, assuming that a first shift speed is the sixth speed and a second shift speed is the third speed, the sixth speed being separated by three speeds from the third speed, it is necessary to actuate the clutches C1 to C3 and the brake B1 when the automatic transmission structured as described thus far is operated for the 6th to 3rd downshift. In the sixth speed, the brake B1 and the clutch C2 serving as first and second engagement elements are engaged, and in the third speed, the clutches C1 and C3 serving as third and fourth engagement elements are engaged.

To that end, in the sixth speed, the shift control processing unit 91 (see FIG. 1) of the controller 25 (see FIG. 5) executes a shift control process to apply the line pressure $P_L$ to the hydraulic servos C-2 and B-1 for engagement of each of the clutch C2 and the brake B1. Accordingly the sixth speed is realized.

A shift output generation processing unit, not shown, of the controller 25 executes a shift output generating process by reading the degree of throttle opening detected by the throttle-opening sensor 32 and the vehicle speed detected by the vehicle-speed sensor 34. The shift output generation processing unit then refers to a shift map (not shown) stored in the storage unit 27 and reads out the third speed, i.e., a shift speed corresponding to the detected degree of throttle opening and the detected vehicle speed, and then generates a shift output for the third speed. Then, for the 6th to 3rd downshift, the shift control processing unit 91 transitionally generates a shift output for the fourth speed to establish the fourth speed as a third shift speed. Then, in the 6th to 4th downshift, the shift control processing unit 91 cause engagement of the clutches C1 and C2 serving as the third and second engagement elements for the fourth speed. After realizing a fourth gear ratio, the shift control processing unit 91 starts a 4th to 3rd downshift and causes engagement of the clutches C1 and C3 to realize the third speed.

In the embodiment, the release of the brake B1 is started before the release of the clutch C2 and the engagement of the clutch C1 is finished before the engagement of the clutch C3. Before finishing engagement of the clutch C1, the release of the clutch C2 is started.

During the process of shifting down from the sixth speed to the third speed, the clutches C1 and C2 are engaged in order to set the fourth speed as the third shift speed, and the 6th to 4th shift is executed as a first shift and the 4th to 3rd shift is executed as a second shift.

It should be noted that, release and the engagement include transitional slipping states up until the completion of release and engagement. Accordingly, the "release start" or "start of release" refers to the start of the slipping state. For example, in the case of the clutches C1 to C3, the brakes B1 to B3, and so on, which are engaged/released by the hydraulic pressure, start of release refers to when the multiple plates begin to slide due to a decrease in hydraulic pressure. In the case of the one-way clutches F1 and F2, which are engaged/released without utilization of hydraulic pressure, the start of release refers to when the clutch begins to freely rotate along with a change in the rotation direction of the rotating member.

"Completion of engagement" refers to termination of the slipping state. For example, in the case of the clutches C1 to C3, the brakes B1 to B3, and so on, engaged/released by means of the hydraulic pressure, completion of engagement refers to when the multiple plates stop sliding due to an increase in the hydraulic pressure. In the case of the one-way clutches F1 and F2 engaged/released without utilization of hydraulic pressure, completion of engagement refers to when the clutch is locked along with a change in the rotation direction of the rotating member.

Next, a description will be given of the operation of the controller 25 when executing a 6th to 3rd shift.

For the 6th to 3rd shift, the shift control processing unit 91 generates drive signals for generating the B-1 servo hydraulic pressure $P_{B1}$, the C-2 servo hydraulic pressure $P_{C2}$, the C-1 servo hydraulic pressure $P_{C1}$, and the C-3 servo hydraulic pressure $P_{C3}$, which are the first to fourth servo hydraulic pressures. The shift control processing unit 91 then sends the drive signals to the corresponding first to fourth solenoids SL1 to SL4.

First, an operation of the shift control processing unit 91 for releasing the brake B1 in the 6th to 4th downshift will be described.

Figure 7:
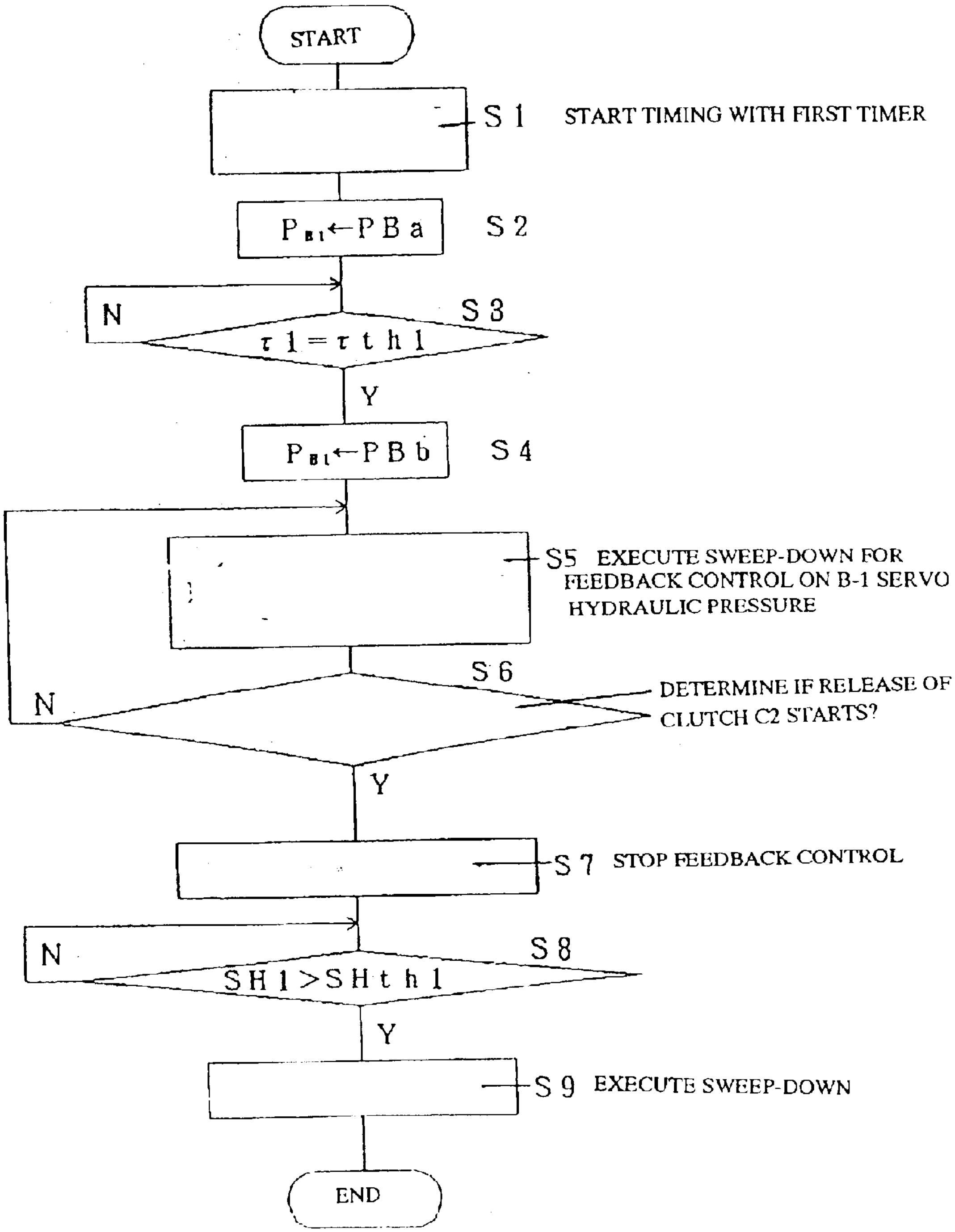
FIG. 7 is a flow chart showing a first operation in a shift control process according to the embodiment of the present invention.
Figure 8A:
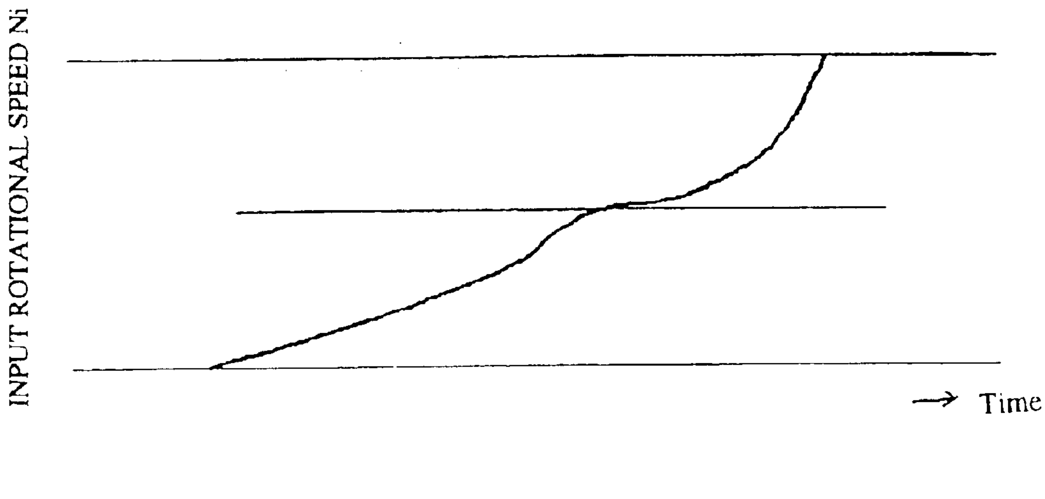
FIGS. 8A and 8B are time charts showing the first operation in the shift control process according to the embodiment of the present invention.
Figure 8B:
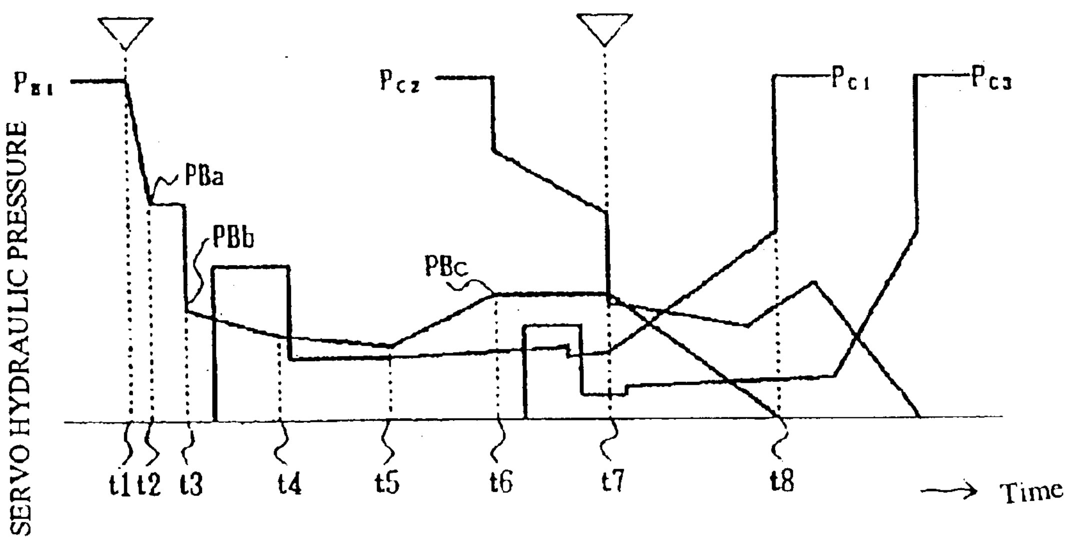

FIG. 7 is a flow chart showing a first operation of the shift control process according to the embodiment of the present invention. FIGS. 8A and 8B are time charts showing the first operation of the shift control process according to the embodiment of the present invention.

First, the shift output generation processing unit generates a shift output for executing the 6th to 3rd shift at time t1. As a result, a first hydraulic pressure control processing unit (not shown) of the shift control processing unit 91 (FIG. 1) executes a first hydraulic pressure control process to: start release of the brake B1; to allow a first timer (not shown) incorporated in the controller 25 (FIG. 5) to start timing; and to set a B-1 servo hydraulic pressure $P_{B1}$ at a value PBa, PBa being lower by a predetermined hydraulic pressure than the engagement pressure indicating a hydraulic pressure required for engaging the brake B1, i.e., the line pressure $P_L$ according to the embodiment. This is executed in order to prevent engine racing from being caused by variations in actuation of the clutch C1, due to individual differences and variations with the passage of time in each shift device 23 (FIG. 2).

The B-1 servo hydraulic pressure $P_{B1}$ reaches a value PBa at time t2, whereupon the value PBa is maintained. Then, at time t3, a time of the first timer, i.e., a timed time τ1, reaches a preset value τth1, whereupon the first hydraulic pressure control processing unit abruptly decreases the B-1 servo hydraulic pressure $P_{B1}$ to a predetermined value PBb.

Then, the first hydraulic pressure control processing unit executes a sweep-down process to gradually decrease the B-1 servo hydraulic pressure $P_{B1}$ under feedback control, between time t3 and time t5. For this process, a rotational speed change calculation processing unit (not shown) of the shift control processing unit 91 carries out a rotational speed change calculating process by reading an input rotational speed Ni detected by the input rotational speed sensor 33 and calculating a rotation change rate ΔNi of the input rotational speed Ni. In addition, the first hydraulic pressure control processing unit then sets a B-1 servo hydraulic pressure $P_{B1}$ such that the rotation change rate ΔNi does not exceed a threshold value ΔNith. Hence, the rotation change rate ΔNi does not change substantially and racing of the engine is prevented. A gradient ΔPB1 of the B-1 servo hydraulic pressure $P_{B1}$ between time t3 and time t4 is set larger than a gradient ΔPB2 of the B-1 servo hydraulic pressure $P_{B1}$ between time t4 and time t5.

Between time t5 and time t6, the first hydraulic pressure control processing unit executes a feedback control on the B-1 servo hydraulic pressure $P_{B1}$ in accordance with a target ratio of rotation change, input torque and the capacity of the clutch C1.

A decrease of the C-2 servo hydraulic pressure $P_{C2}$ of the clutch C2 is started at time t6, whereupon the first hydraulic pressure control processing unit stops the feedback control and maintains the B-1 servo hydraulic pressure $P_{B1}$ at a value PBc as of time t6. Hence, until the 6th to 4th shift is completed, the B-1 servo hydraulic pressure $P_{B1}$ is maintained at the value PBc, and is prevented from increasing through feedback control. Thus, even if the C-2 servo hydraulic pressure $P_{C2}$ is decreased when the 4th to 3rd shift is started, locking (tie-up) in the shift device 23 is prevented. By inhibiting increase in the B-1 servo hydraulic pressure $P_{B1}$ and increase in a torque capacity of the brake B1 before start of release of the clutch C2, it is possible to prevent a step-like shift shock from being caused by delayed progression of shifting.

Engine racing could potentially be generated due to the control for the input rotational speed Ni coming to a stop along with a stopping of the feedback control. However, the engagement of the clutch C1 is initiated after starting the 4th to 3rd shift, and thus there is no need to prevent engine racing.

After starting release of the brake B1, the engagement of the clutch C1 is started at predetermined time. Along with this, the 6th to 4th shift is started. A shift index calculation processing unit (not shown) of the shift control processing unit 91 executes a shift index calculating process by reading the input rotational speed Ni detected by the input rotational speed sensor 33, and the output rotational speed No detected by the vehicle speed sensor 34, during the time between the start and the completion of the 6th to 4th shift. Then, an index indicating a progression state of the process of the 6th to 4th downshift, namely, a shift index value SH1, is calculated.

The embodiment gives the shift index value SH1 as follows:

$$SH1=(Ni-Rg6\cdot No)\times 100/No\cdot(Rg4-Rg6)\ (\%)$$

where Rg6 is a gear ratio in the sixth speed and Rg4 is a gear ratio in the fourth speed.

The shift index value SH1 may be represented as the input rotational speed Ni or a predetermined servo hydraulic pressure of the B-1 servo hydraulic pressure $P_{B1}$, or the like.

Next, the first hydraulic pressure control processing unit reads the shift index value SH1 and determines whether or not the shift index value SH1 is higher than a threshold value SHth1 (e.g., 90(%)) in order to determine whether or not the fourth speed is realized and the fourth gear ratio Rg4 is established. If at time t7 the shift index value SH1 exceeds the threshold value SHth1, and the fourth speed is realized and the gear ratio Rg4 of the fourth speed is established, the 6th to 4th shift is completed and the first hydraulic pressure control processing unit executes the sweep-down process to decrease the B-1 servo hydraulic pressure $P_{B1}$ at a gradient ΔPB3 in order to completely release the hydraulic pressure from the inside of the hydraulic servo B-1. The gradient ΔPB3 is set greater than the gradient ΔPB1. For this reason, the full output of the solenoid valve 43 allows decrease of the B-1 servo hydraulic pressure $P_{B1}$ at the gradient ΔPB3. Hence, without monitoring the B-1 hydraulic pressure $P_{B1}$ for determination, the first hydraulic pressure control process for releasing the brake B1 is completed at time t8.

Next, the flow chart in FIG. 7 will be described. In step S1, the first timer starts clocking. In step S2, a value PBa is set for a B-1 servo hydraulic pressure $P_{B1}$. In step S3, the shift control processing unit 91 stands by until a timed time τ1 reaches a value τth1. In step S4, a value PBb is set for the B-1 servo hydraulic pressure $P_{B1}$. In step S5, a sweep-down process is executed for a feedback control performing on the B-1 servo hydraulic pressure $P_{B1}$. In step S6, it is determined whether or not release of the clutch C2 is started. If release of the clutch C2 is started, the process proceeds to step S7. If not started, the process returns to step S5. In step S7, the feedback control is stopped. In step S8, the shift control processing unit 91 stands by until a shift index value SH1 exceeds a threshold value SHth1. In step S9, a sweep-down process is executed and the process terminates.

Next, an operation of the shift control processing unit 91 for engagement of the clutch C1 in the 6th to 4th shift will be described.

Figure 9:
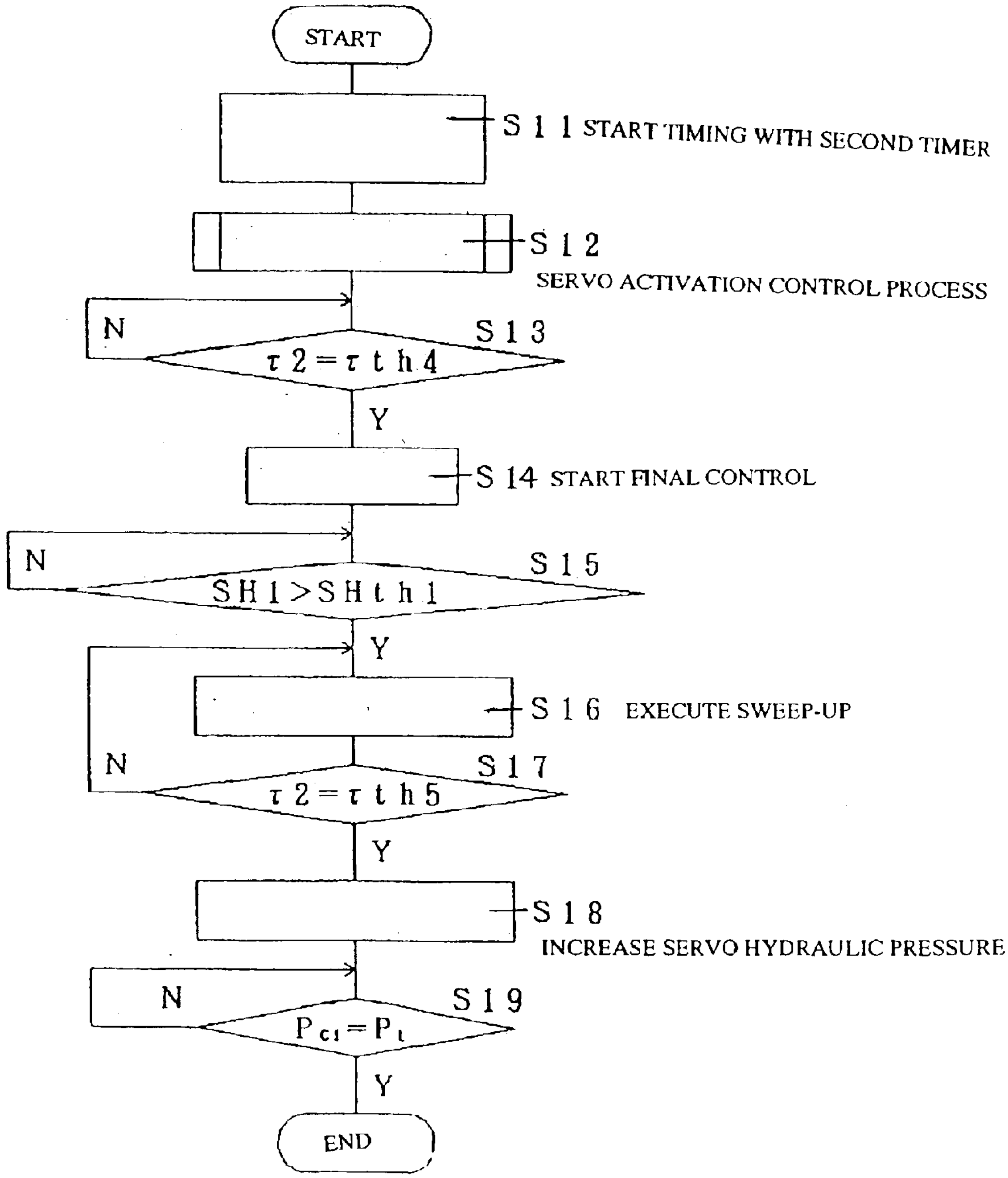
FIG. 9 is a flow chart showing a second operation in the shift control process according to the embodiment of the present invention.
Figure 10A:
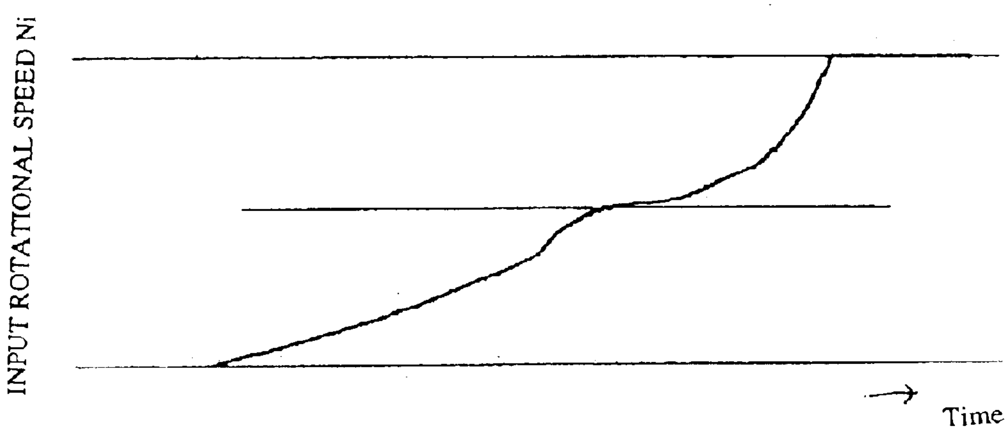
FIGS. 10A and 10B are time charts showing the second operation in the shift control process according to the embodiment of the present invention.
Figure 10B:
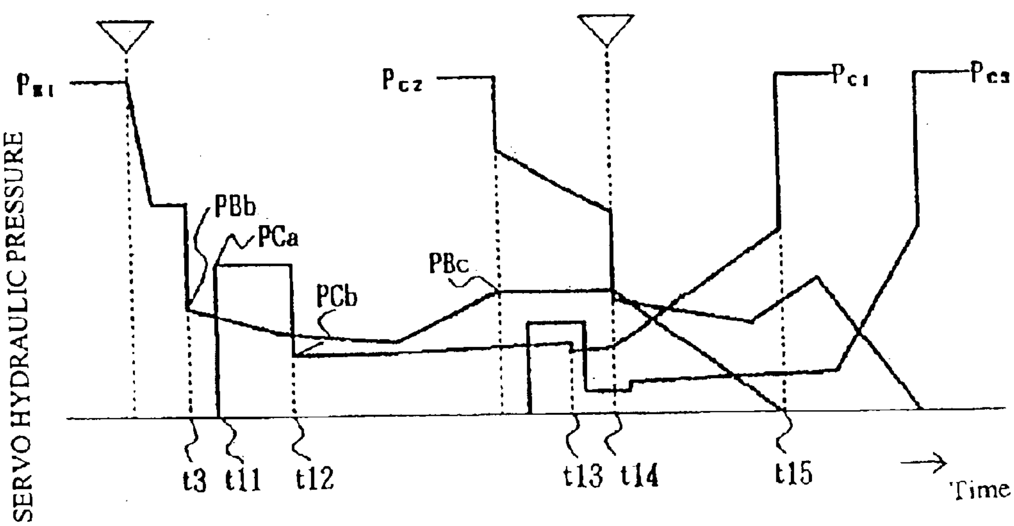

FIG. 9 is a flow chart showing a second operation in the shift control process according to the embodiment of the present invention. FIGS. 10A and 10B are time charts showing the second operation in the shift control process according to the embodiment of the present invention.

As described above, at time t3, in the first hydraulic pressure control process, the timed time τ1 of the first timer reaches a value τth1, whereupon the sweep-down process for the B-1 servo hydraulic pressure $P_{B1}$ is started. After a very short time has elapsed since the start of the sweep-down process, the timed time τ1 of the first timer reaches a value τth2. Then, at time t11, a second hydraulic pressure control processing unit (not shown) of the shift control processing unit 91 (FIG. 1) executes a second hydraulic pressure control process to start engagement of the clutch C1, and a second timer (not shown) incorporated in the controller 25 (FIG. 5) starts timing.

In addition, a servo activation control processing unit of the second hydraulic pressure control processing unit executes a servo activation control process, and a fast-fill process in which the C-1 servo hydraulic pressure $P_{C1}$ is set at a predetermined value Pca in order to fill the hydraulic servo C-1 for the clutch C1 with hydraulic fluid at time t11. When a timed time τ2 of the second timer reaches a value τth3, at time t12, the servo activation control processing unit decreases the C-1 servo hydraulic pressure $P_{C1}$ to a value PCb, which indicates a piston stroke pressure for shortening the gap between the piston of the hydraulic servo C-1 and the friction plate of the clutch C1. Then, the servo activation control processing unit increases the C-1 servo hydraulic pressure $P_{C1}$ at a gradient ΔPC1 and executes a sweep-up process.

Next, the second hydraulic pressure control processing unit estimates a time t14 (which is the same as time t7) at which the 6th to 4th shift is finished. At time t13, which is earlier than the estimated time t14 by a time Δτa representing a predetermined time period set in advance, when the timed time τ2 reaches a value τth4, the second hydraulic pressure control processing unit finishes the sweep-up process. Then, the hydraulic pressure control processing unit starts a final control to decrease the C-1 servo hydraulic pressure $P_{C1}$ to a level slightly lower than a hydraulic pressure permitting the starting of engagement of the clutch C, so that the former is just below the latter. Furthermore, the time Δτa can be set so as to execute the final control at an any given time point in a time period from starting of a decrease of the C-2 servo hydraulic pressure $P_{C2}$, at time t21, to starting of release of the clutch C2, at time t22, to be described later.

For the above estimation, typically, due to the fact that the output rotational speed No does not change much between before starting of shifting and after completion of shifting, the second hydraulic pressure control processing unit reads an output rotational speed No detected by the vehicle speed sensor 34 as an output rotational speed Noe generated after completion of the 6th to 4th shift, and also reads an input rotational speed Ni detected by the input rotational speed sensor 33. Then, the second hydraulic pressure control processing unit calculates a difference ΔNoi between the output rotational speed Noe and the input rotational speed Ni as follows:

$$\Delta Noi=Noe-Ni.$$

Next, the second hydraulic pressure control processing unit calculates a rotation change rate ΔNi of the input rotational speed Ni, and divides the aforementioned difference ΔNoi by the resulting rotation change rate ΔNi to calculate a time from the present until completion of the 6th to 4th downshift. Accordingly, the time t14 is obtained. Then, the second hydraulic pressure control processing unit calculates the value τth4 corresponding to the time t13 which is earlier than the obtained time t14 by a time Δτa.

Next, the second hydraulic pressure control processing unit reads the shift index value SH1 calculated by the shift index calculation processing unit, and determines whether or not the shift index value SH1 is higher than the threshold value SHth1 for determining whether or not the 6th to 4th downshift has been realized. If the shift index value SH1 is higher than the threshold value SHth1 and the 6th to 4th downshift is completed, the second hydraulic pressure control processing unit increases the C-1 servo hydraulic pressure $P_{C1}$ at a gradient ΔPC2, at time t14 (which is the same as time t7), and executes the sweep-up process.

Then, at time t15, which is later than time t14 by a time Δτb representing a predetermined time period set in advance, when the timed time $\tau 2$ of the second timer reaches a value $\tau$th5, the second hydraulic pressure control processing unit increases the C-1 servo hydraulic pressure $P_{C1}$ to the line pressure $P_L$ in order to reliably maintain engagement of the clutch C1.

After the C-1 servo hydraulic pressure $P_{C1}$ reaches the line pressure $P_L$ at time t15, the second hydraulic pressure control processing unit finishes the second hydraulic pressure control process.

In the above case, during the time period from time t13 to time t14, it is possible to prevent the fourth speed from being realized because the C-1 servo hydraulic pressure $P_{C1}$ is set slightly lower, so as to be just below the hydraulic pressure for engagement. Thus, the clutch C1 is gently engaged during the time period from time t14 to time t15, resulting in prevention of a step-like shift shock from being generated along with the 6th to 4th downshift.

Next, the flow chart in FIG. 9 will be described. Instep S11, the second timer starts timing. In step S12, the servo activation control process is executed. In step S13, the shift control processing unit 91 stands by until a timed time $\tau 2$ reaches a value $\tau$th4. In step S14, a final control process is started. In step S15, the shift control processing unit 91 stands by until the shift index value SH1 exceeds a threshold value SHth1. In step S16, a sweep-up process is performed. In step S17, it is determined whether or not the timed time $\tau 2$ has reached a value $\tau$th5. If the timed time $\tau 2$ has reached the value $\tau$th5, the process proceeds to step S18. If not, the process returns to step S16. In step S18, the C-1 servo hydraulic pressure $P_{C1}$ is increased. In step S19, the shift control processing unit 91 stands by until the C-1 servo hydraulic pressure $P_{C1}$ reaches a line pressure $P_L$, and terminates the process when the C-1 servo hydraulic pressure $P_{C1}$ reaches the line pressure $P_L$.

Next, an operation of the shift control processing unit 91 for release of the clutch C2 in the 6th to 4th shift will be explained.

Figure 11:
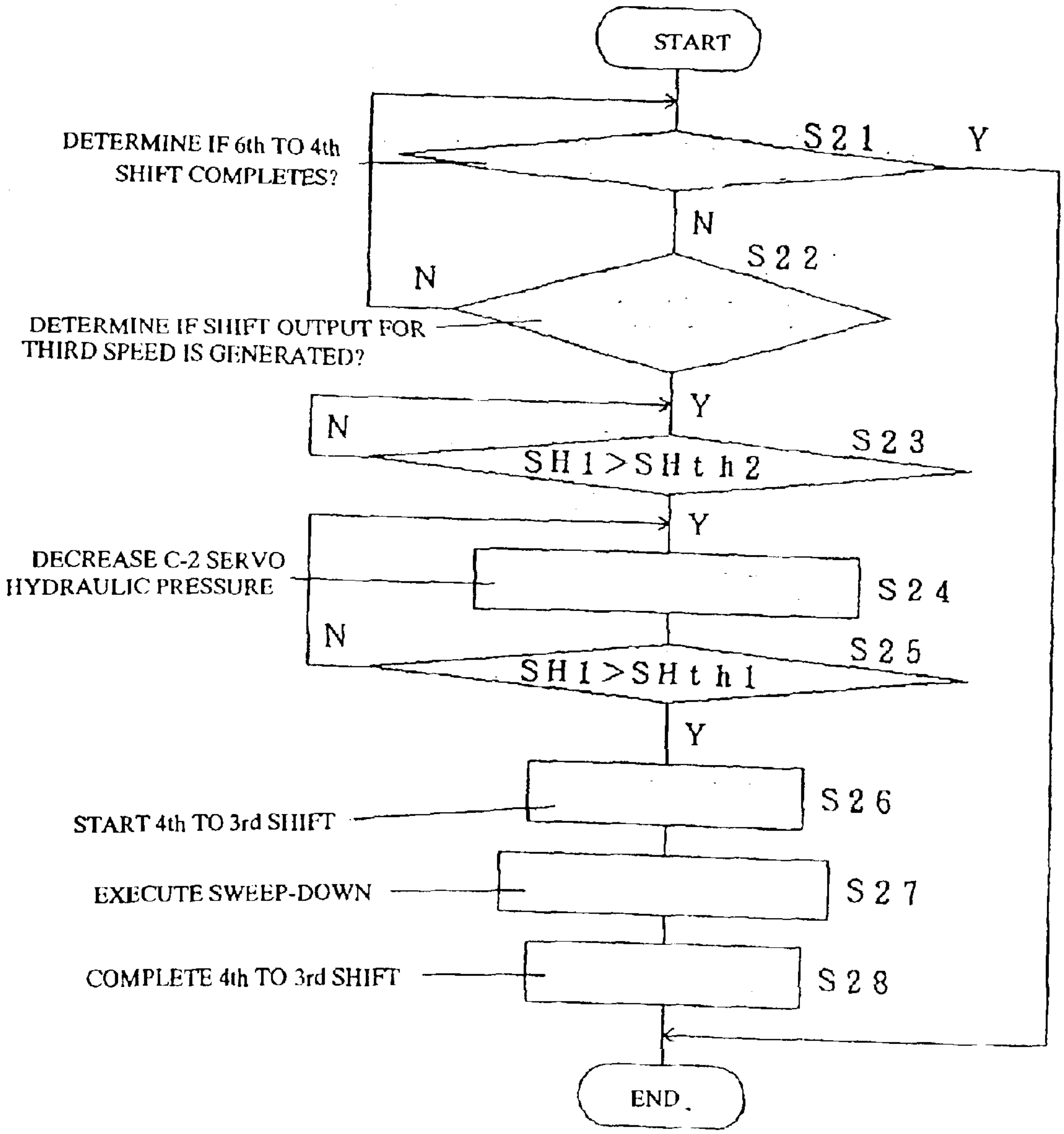
FIG. 11 is a flow chart showing a third operation in the shift control process according to the embodiment of the present invention.
Figure 12A:
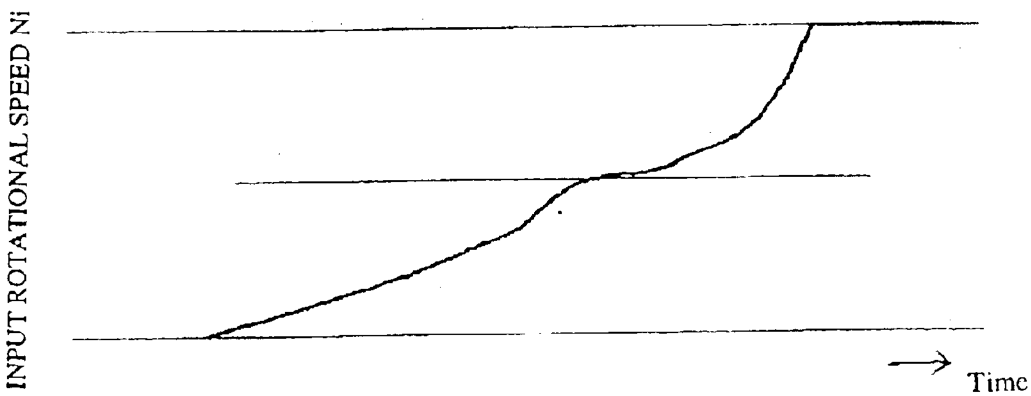
FIGS. 12A and 12B are time charts showing the third operation in the shift control process according to the embodiment of the present invention.
Figure 12B:
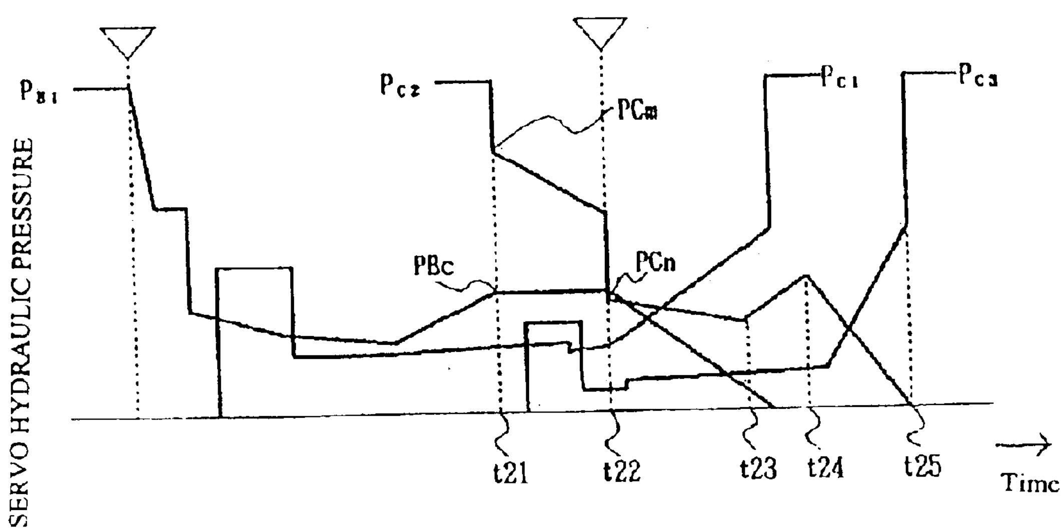

FIG. 11 is a flow chart showing a third operation in the shift control process according to the embodiment of the present invention. FIGS. 12A and 12B are time charts showing the third operation in the shift control process according to the embodiment of the present invention.

In the third operation, a third hydraulic pressure control processing unit (not shown) of the shift control processing unit 91 (FIG. 1) determines whether or not the 6th to 4th shift is completed. If the 6th to 4th shift is not completed, the third hydraulic pressure control processing unit performs a third hydraulic controlling process, and if the 6th to 4th shift is already completed, it does not perform the third hydraulic controlling process. Then, the third hydraulic pressure control processing unit waits until a shift output for third speed is generated in order to execute the 6th to 3rd shift.

When the shift output for third speed is generated, the third hydraulic pressure control processing unit reads the shift index value SH1 calculated by the shift index calculation processing unit, and determines whether or not the shift index value SH1 is higher than a threshold value SHth2. If the shift index value SH1 is higher than the threshold value SHth2, the third hydraulic pressure control processing unit starts to decrease the C-2 servo hydraulic pressure $P_{C2}$ at time t21 to a predetermined value PCm. The C-2 servo hydraulic pressure $P_{C2}$ is decreased sharply to the predetermined value PCm, which is such that slipping does not start.

In the embodiment, the threshold value SHth2 is a predetermined value set in a range from 50 (%)-or-more to 80 (%)-or-less. In addition, it is possible to shorten a time required for adequately decreasing the C-2 servo hydraulic pressure $P_{C2}$ because the threshold value SHth2 is set equal-to-or-lower-than 80 (%). Accordingly, time t14 at which the sweep-up process for the C-1 servo hydraulic pressure $P_{C1}$ is started in the second hydraulic pressure control process is not delayed. Accordingly, it is possible to shorten a shift time required for the 6th to 3rd shift.

Furthermore, the value Pcm is obtained by adding a hydraulic pressure Ps, which is a margin of safety, to a hydraulic pressure PCt of the hydraulic servo C-2, which is necessary with respect to torque input to the shift device 23 (FIG. 2) in the conditions of sixth speed, i.e., an input torque Ti. The value Pcm is obtained as follows:

$$PCm=PCt+Ps$$

In order to calculate the value PCm, the third hydraulic pressure control processing unit first reads the degree of throttle opening detected by the throttle-opening sensor 32 (FIG. 5), and an engine speed detected by the engine speed sensor 31, and refers to the engine torque map stored in the storage unit 27. Then, the third hydraulic pressure control processing unit calculates an engine torque TE corresponding to the degree of throttle opening and the engine speed. The third hydraulic pressure control processing unit also reads an input rotational speed detected by an input rotational speed sensor placed in an input side of the torque converter 22, and an output rotational speed detected by an output rotational speed sensor placed in an output side of the torque converter 22, and then calculates a speed ratio $\epsilon$ in the torque converter 22. Then, the third hydraulic pressure control processing unit multiplies the engine torque TE by the speed ratio $\epsilon$ to obtain the input torque Ti.

Following this, the third hydraulic pressure control processing unit calculates the hydraulic pressure PCt from the following expression:

$$PCt=\mathrm{Ti}\cdot Pst/(S_{C2}\cdot M_{C2}\cdot r_{C2}\cdot q_{C2})$$

where $S_{c2}$ is the pressure-receiving area of the piston of the hydraulic servo C-2 for the clutch C2 serving as an applicable friction engagement element, $M_{C2}$ is the number of friction plates in the clutch C2, $r_{C2}$ is an effective radius of each friction plate, $q_{C2}$ is a friction coefficient of each friction plate, and Pst is a piston stroke pressure of the hydraulic servo C-2.

In this way, when the C-2 servo hydraulic pressure $P_{C2}$ is set to the value PCm, the third hydraulic pressure control processing unit decreases the C-2 servo hydraulic pressure $P_{C2}$ as follows:

$$P_{C2}=\alpha\cdot f(tq)+\beta\cdot f(PBc)+\gamma\cdot f(P_{C1})$$

where f(tq) is a value required for maintaining a sixth speed state without slipping of the clutch C2 with respect to a clutch retaining torque tq generated in response to the input torque Ti; f(PBc) is a correction value required for maintaining the sixth speed state without slipping of the clutch C2 with respect to the value PBc of the B-1 servo hydraulic pressure $P_{B1}$ which is maintained from time t6 (which is the same as time t21) to time t7 (which is the same as time t22) in the first hydraulic pressure control process; $f(P_{C1})$ is a correction value required for maintaining the sixth speed state without slipping of the clutch C2 with respect to the shared torque of the clutch C2 which fluctuates in accordance with a change in the C-1 servo hydraulic pressure $P_{C1}$; and $\alpha$, $\beta$ and $\gamma$ are respective gains.

The clutch retaining torque tq is calculated based on the input torque Ti excluding inertia, an input rotational speed Ni detected by the input rotational speed sensor 33, and an inertia torque In (Ni) according with the input rotational speed Ni. The formula for calculation is as follows:

$$tq=\mathrm{Ti}-\mathrm{In(Ni)}$$

In this case, a torque capacity representing torque maintained by the brake B1 is not changed because, as described above, from time t6 to time t7 in the first hydraulic pressure control process, the feedback control is stopped and therefore the value PBc of the B-1 servo hydraulic pressure $P_{B1}$ is maintained at a small value so that the B-1 servo hydraulic pressure $P_{B1}$ is not changed, as of time t6. This provides a constant correction value f(PBc) and eliminates the need to change the torque capacity required of the clutch C2 in accordance with the torque capacity of the brake B1. In this way, an increase in the torque capacity required of the clutch C2 is inhibited, thus preventing a step-like shift shock from being caused by delayed progression of shifting.

As described above, while decreasing the C-2 servo hydraulic pressure $P_{C2}$, the third hydraulic control processing unit reads a shift index value SH1 calculated by the shift index calculation processing unit and determines whether or not the shift index value SH1 is higher than the threshold value SHth1.

The shift index value SH1 exceeds the threshold value SHth1 at time t22. At this point, the third hydraulic pressure control processing unit makes a pre-synchronization determination as to whether or not the gear ratio for the fourth speed is realized, then terminates the 6th to 4th shift, and starts release of the clutch C2 for starting a 4th to 3rd shift.

Along with this, the shift index calculation processing unit executes the shift index calculating process by reading the input rotational speed Ni detected by the input rotational speed sensor 33 and the output rotational speed No detected by the vehicle speed sensor 34, during the time period between the starting and the finishing of the 4th to 3rd shift. Then, a shift index value SH2 representing the progress of the 4th to 3rd shift is calculated.

According to this embodiment, the shift index value SH2 is expressed as follows:

$$SH2=(\mathrm{Ni}-Rg4\cdot No)\times 100/No\cdot(Rg3-Rg4)\ (\%),$$

where, Rg4 is the gear ratio for the fourth speed and Rg3 is a gear ratio for the third speed.

The shift index value SH2 can also be represented by the input rotational speed Ni or a predetermined servo hydraulic pressure of the C-2 servo hydraulic pressure $P_{C2}$, or the like.

The third hydraulic pressure control processing unit sharply decreases the C-2 servo hydraulic pressure $P_{C2}$ to an initial value PCn. Along with this, release of the clutch C2 is started. Furthermore, the initial value PCn is set lower than that set in the process for executing the 4th to 3rd shift when the vehicle is running at a constant speed, rather than that for the jump shift, such that the input rotational speed Ni is immediately changed along with starting of the 4th to 3rd shift.

Next, in order to start release of the clutch C2, the third hydraulic pressure control processing unit decreases the C-2 servo hydraulic pressure $P_{C2}$ at a gradient ΔPC11, at time t22, for the sweep-down process. Then, the third hydraulic pressure control processing unit controls the C-2 servo hydraulic pressure $P_{C2}$ to obtain a target ratio of rotation change from time t23 to time t24, and then decreases the C-2 servo hydraulic pressure PC2 at a gradient ΔPC13 at time t24 for the sweep-down process. The gradient ΔPC3 is larger than the gradient ΔPC11. For this reason, the full output of the solenoid valve 44 allows a decrease of the C-2 servo hydraulic pressure $P_{C2}$ at the gradient ΔPC13. Hence, without monitoring the C-2 servo hydraulic pressure $P_{C2}$ for determination, the third hydraulic pressure control process for releasing the clutch C2 is completed at time t25. In this manner, the 4th to 3rd shift is completed.

While the C-1 servo hydraulic pressure $P_{C1}$ is increased at the gradient ΔPC2 for the sweep-up process in the second hydraulic pressure control process, the C-2 servo hydraulic pressure $P_{C2}$ is decreased at the gradient ΔPC11 in order to start release of the clutch C2 in the third hydraulic pressure control process. Hence, even when the torque capacity of the clutch C1 is increased, shift shock is inhibited because release of the clutch C2 is started.

In order to prevent engine racing from being caused along with a decrease of the C-2 servo hydraulic pressure $P_{C2}$ at the gradient ΔPC11, the third hydraulic pressure control processing unit executes the feedback control for the C-2 servo hydraulic pressure $P_{C2}$ based on the rotation change rate ΔNi. At this point, the 4th to 3rd shift is preferably started when the gear ratio Rg4 for the fourth speed is established during the 6th to 4th shift. Accordingly, in order that the 4th to 3rd shift automatically starts when the gear ratio Rg4 for fourth speed is established, the C-2 servo hydraulic pressure $P_{C2}$ is set such that the clutch C2 automatically enters a slipping state and release of the clutch C2 is started, along with the C-1 servo hydraulic pressure $P_{C1}$ increasing at the gradient ΔPC2 and the sweep-up processes starting. Furthermore, during the interruption of the feedback control from time t6 to time t7 in the first hydraulic pressure control process, the third hydraulic pressure control processing unit can execute the feedback control for the C-2 servo hydraulic pressure $P_{C2}$ based on the rotational change rate ΔNi.

Next the flow chart in FIG. 11 will be described.

In step S21, it is determined whether or not the 6th to 4th shift is completed. If the 6th to 4th shift completes, the process exits. If not, the process proceeds to step S22. In step S22, it is determined whether or not a shift output for third speed has been generated. If the shift output for third speed has been generated, the process proceeds to step S23. If not, the process returns to step S21. In step S23, the shift control processing unit 91 stands by until the shift index value SH1 exceeds a threshold value SHth2. In step S24, the C-2 servo hydraulic pressure $P_{C2}$ is decreased. In step S25, it is determined whether the shift index value SH1 exceeds a threshold value SHth1. If the shift index value SH1 exceeds the threshold value SHth1, the process proceeds to step S26. If the shift index value SH1 is equal to or lower than the threshold value SHth1, the process returns to step S24. In step S26, a 4th to 3rd shift is started. In step S27, the sweep-down process is executed. In step S28, the 4th to 3rd shift is completed and the process terminates.

Next, an operation of the shift control processing unit 91 for engagement of the clutch C3 in the 4th to 3rd shift will be described.

Figure 13:
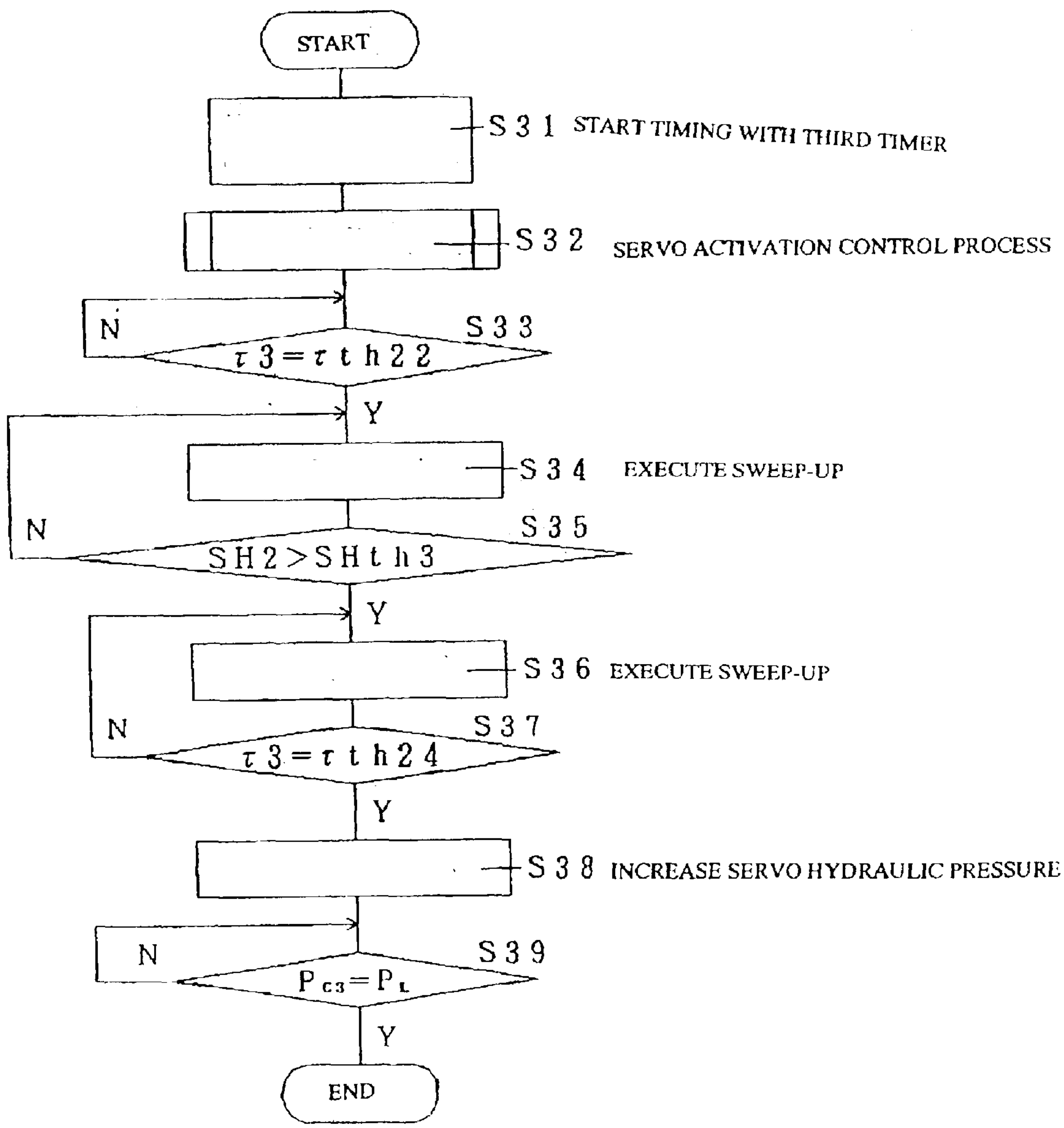
FIG. 13 is a flow chart showing a fourth operation in the shift control process according to the embodiment of the present invention.
Figure 14A:
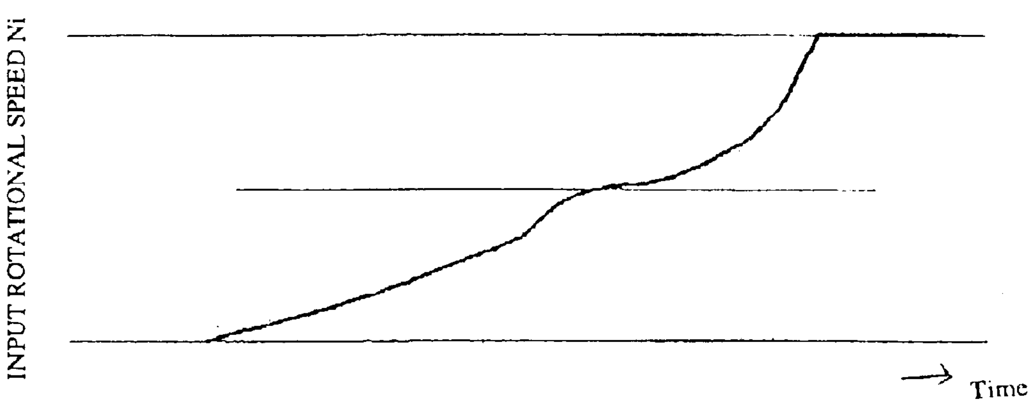
FIGS. 14A and 14B are time charts showing the fourth operation in the shift control process according to the embodiment of the present invention.
Figure 14B:
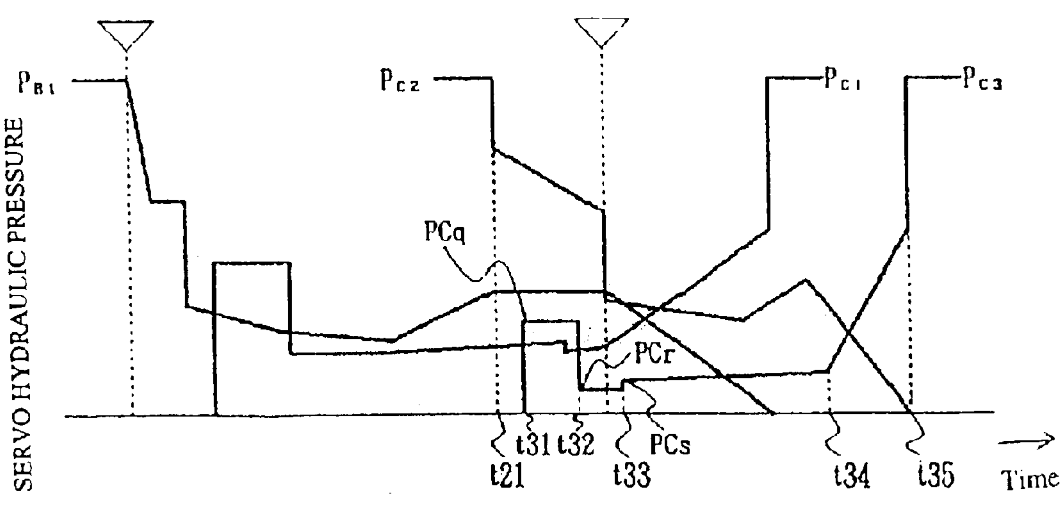

FIG. 13 is a flow chart showing a fourth operation in the shift control process according to the embodiment of the present invention. FIGS. 14A and 14B are time charts showing the fourth operation in the shift control process according to the embodiment of the present invention.

As described above, release of the clutch C2 (FIG. 1) is started at time t21 in the third hydraulic pressure control process. The shift control processing unit 91 causes a third timer (not shown) incorporated in the controller 25 (FIG. 5) to start timing at time t21. After a very short period of time has elapsed from the start of timing, the timed time τ3 of the third timer reaches a value τth21. At this point, at time t31, a fourth hydraulic pressure control processing unit (not shown) of the shift control processing unit 91 executes a fourth hydraulic pressure control process to start engagement of the clutch C3. A servo activation control processing unit of the fourth hydraulic pressure control processing unit executes a servo activation control process, and executes the fast-fill process for the C-3 servo hydraulic pressure $P_{C3}$ at a predetermined value PCq, in order to fill the hydraulic pressure servo C-3 for the clutch C3 with hydraulic fluid at time t31. When the timed time τ3 reaches a value τth22, at time t32, the servo activation control processing unit decreases the C-3 servo hydraulic pressure $P_{C3}$ to a value PCr slightly lower than a value PCs representing a piston stroke pressure for starting engagement of the clutch C3. After that, when the timed time τ3 reaches a value τth23, at time t33, the servo activation control processing unit increases the C-3 servo hydraulic pressure $P_{C3}$ to the value PCs. Then, the C-1 servo hydraulic pressure $P_{C1}$ is increased at the gradient ΔPC21 for the sweep-up process.

After completion of the fast-fill process for the hydraulic pressure servo C-3, the C-3 servo hydraulic pressure $P_{C3}$ is temporary decreased, and then the sweep-up process is executed. Hence, when the gear ratio RG4 for fourth speed is achieved, a starting of an engagement of the clutch C3 is reliably inhibited. As a result, it is possible to delay the progression of shifting and prevent shift shock due to the delayed progression of shifting.

Next, the fourth hydraulic pressure control processing unit reads a shift index value SH2 calculated by the shift index calculation processing unit, and determines whether or not the shift index value SH2 is higher than the threshold value SHth3 (e.g., 70(%)). When the shift index value SH2 exceeds the threshold value SHth3, the fourth hydraulic pressure control processing unit increases the C-3 servo hydraulic pressure $P_{C3}$ at the gradient ΔPC22 at time t34 for the sweep-up process.

Then, at time t35, which is later than time t33 by a preset time Δτc, when the timed time τ3 reaches a value τth24, the fourth hydraulic pressure control processing unit sharply increases the C-3 servo hydraulic pressure $P_{C3}$ to the line pressure $P_L$ in order to reliably maintain engagement of the clutch C3.

When the C-3 servo hydraulic pressure $P_{C3}$ reaches the line pressure $P_L$ at time t35, the fourth hydraulic pressure control processing unit terminates the fourth hydraulic pressure control process.

Next, the flow chart in FIG. 13 is described.

In step S31, the third timer starts timing. In step S32, the servo activation control process is executed. In step S33, the shift control processing unit 91 stands by until the timed time τ3 reaches the value τth22. In step S34, the sweep-up process is performed. In step S35, it is determined whether or not the shift index value SH2 exceeds the threshold value SHth3. If the shift index value SH2 is higher than the threshold value SHth3, the process proceeds to step S36. If the shift index value SH2 is lower than the threshold value SHth3, the process returns to step S34. In step S36, the sweep-up process is performed. In step S37, it is determined whether or not the timed time τ3 has reached the value τth24. If the timed time τ3 reaches the value τth24, the process proceeds to step S38. If not, the process returns to step S36. In step S38, the C-3 servo hydraulic pressure $P_{C3}$ is increased. In step S39, the shift control processing unit 91 stands by until the C-3 servo hydraulic pressure $P_{C3}$ reaches the line pressure $P_L$, and terminates the process when the C-3 servo hydraulic pressure $P_{C3}$ reaches the line pressure $P_L$.

Next, a description is given of the operation of engagement and release of the clutches C1 to C3 and the brake B1 with changes in the C-1 servo hydraulic pressure $P_{C1}$, the C-2 servo hydraulic pressure $P_{C2}$, the C-3 servo hydraulic pressure $P_{C3}$, and the B-1 servo hydraulic pressure $P_{B1}$.

Figure 15:
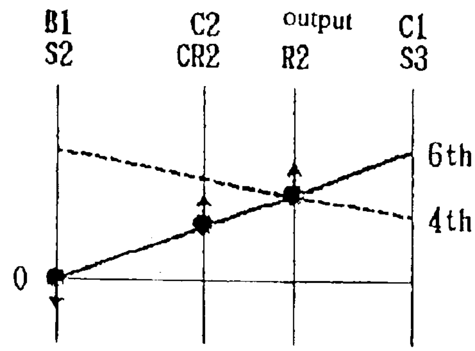
FIG. 15 is a diagram illustrating a first state in the speed chart according to the embodiment of the present invention.
Figure 16:
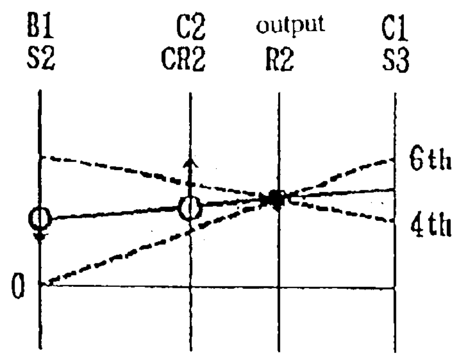
FIG. 16 is a diagram illustrating a second state in the speed chart according to the embodiment of the present invention.
Figure 17:
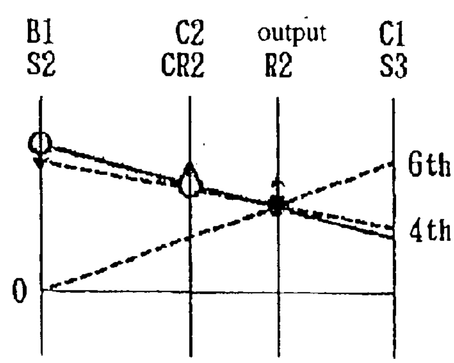
FIG. 17 is a diagram illustrating a third state in the speed chart according to the embodiment of the present invention.
Figure 18:
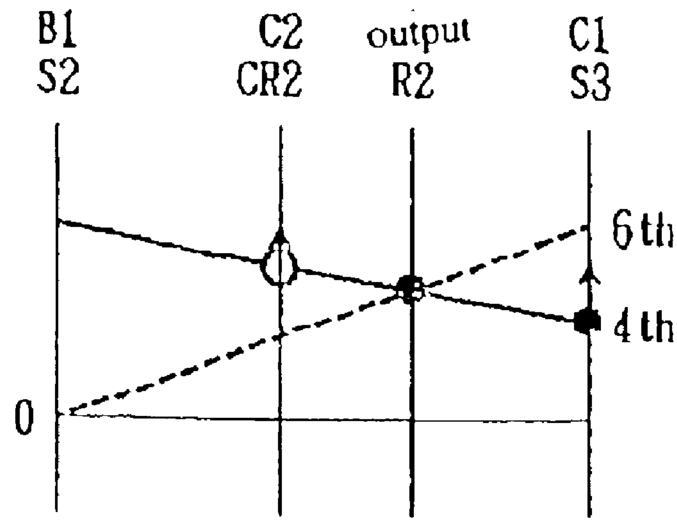
FIG. 18 is a diagram illustrating a fourth state in the speed chart according to the embodiment of the present invention.
Figure 19:
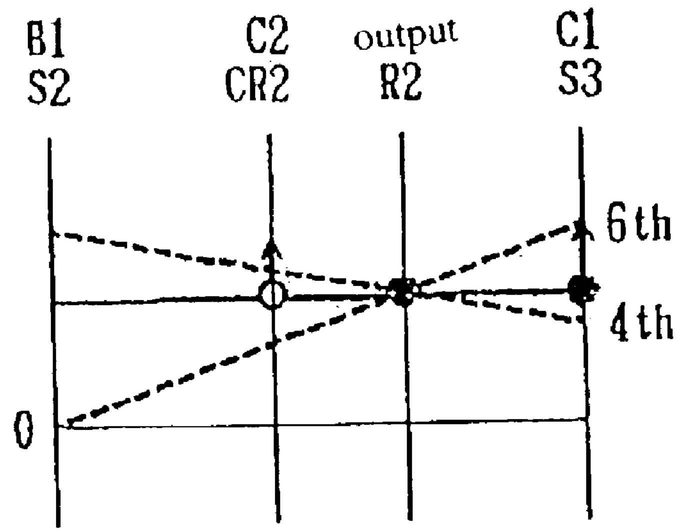
FIG. 19 is a diagram illustrating a fifth state in the speed chart according to the embodiment of the present invention.

FIG. 15 is a diagram illustrating a first state in the speed chart according to the embodiment of the present invention. FIG. 16 is a diagram illustrating a second state in the speed chart according to the embodiment of the present invention. FIG. 17 is a diagram illustrating a third state in the speed chart according to the embodiment of the present invention. FIG. 18 is a diagram illustrating a fourth state in the speed chart according to the embodiment of the present invention. FIG. 19 is a diagram illustrating a fifth state in the speed chart according to the embodiment of the present invention.

In FIGS. 15 to 19, the reference symbols S2 and S3 denote the sun gears. The reference symbol CR2 denotes the ring gear. The reference symbols C1 and C2 denote the clutches. The reference symbol B1 denotes the brake. The reference symbol 6th denotes a speed line for sixth speed. The reference symbol 4th denotes a speed line for fourth speed.

As described thus far, when the vehicle runs in the sixth speed in constant speed running, rotation is input from the input shaft 11 (FIG. 2) to the carrier CR2 via the clutch C2 without being decelerated. The sun gear S2 receives reaction force generated by engagement of the brake B1, and comes to a stop, and accelerated rotation is output from the ring gear R2 to the output shaft 19.

As shown in FIG. 15, when torque is transmitted via the carrier CR2, the sun gear S2 is subject to reaction force and torque is output from the ring gear R2.

Along with initiation of the 6th to 4th shift, first, in the first hydraulic pressure control process, the B-1 servo hydraulic pressure $P_{B1}$ is decreased to a value PBa (PBa being lower than the line pressure $P_L$ by a predetermined hydraulic pressure), then is abruptly decreased to a predetermined value PBb, and then undergoes the sweep-down process by the feedback control. In the second hydraulic pressure control process, the C-1 servo hydraulic pressure $P_{C1}$ is increased to the predetermined value PCa and undergoes the fast-fill process, then decreases to the value PCb, and then undergoes the sweep-up process.

Along with this, release of the brake B1 is started, and engagement of the clutch C1 is started. Then the input rotational speed Ni starts to increase. At this time, slipping of the brake band constituting a stationary element and the drum constituting a rotation element in the brake B1 is started, whereby, as shown in FIG. 16, the vehicle-speed line is changed from the sixth speed side toward the fourth speed side, reaction force applied to the sun gear S2 is decreased, the sun gear S3 is decelerated, and as a result the sun gear S2 is accelerated.

Next, in the first hydraulic pressure control process, the feedback control is stopped. While the B-1 servo hydraulic pressure $P_{B1}$ is maintained at the value PBc, release of the clutch C2 is started, and the C-2 servo hydraulic pressure $P_{C2}$ is decreased in the third hydraulic pressure control process. During this time, in order to prevent deviation of the gear ratio, the torque capacity of the clutch C2 is set larger than a value derived by adding the inertia of the brake B1 and the reaction force applied to the sun gear S2 (hereinafter referred to as "torque additional value"). Furthermore, the gear ratio does not deviate unless the torque capacity of the clutch C2 becomes smaller than the torque additional value, but as the torque capacity of the clutch C2 decreases, slipping of the clutch C2 occurs more easily. For this reason, in terms of control, it is preferable if the C-2 servo hydraulic pressure $P_{C2}$ is generated such that slipping does not occur.

If the 6th to 4th shift is continued in this way, the vehicle-speed line is beyond the speed line for the fourth speed as shown in FIG. 17, because the torque capacity of the clutch C2 is larger than the torque capacity of the brake B1. In this state, if the torque capacity of the clutch C1 is large, the fourth speed is realized, and torque output via the ring gear R2 is increased, thus causing shift shock. Hence, as described above, when the sweep-up process is performed before the 6th to 4th shift is completed in the second hydraulic pressure control process, the final control process is started to slightly decrease the C-1 servo hydraulic pressure $P_{C1}$, so as to be slightly so as to be just below the hydraulic pressure for engagement When the 6th to 4th shift is completed in the second hydraulic pressure control process, the C-1 servo hydraulic pressure $P_{C1}$ undergoes the sweep-up process, so that the fourth speed is realized from the state in which the vehicle-speed line is beyond the fourth speed as shown in FIG. 18. At this time, the C-2 servo hydraulic pressure $P_{C2}$ is decreased at the gradient ΔPC11 and the increase of the torque output via the ring gear R2 is made more gentle.

Next, when starting the 4th to 3rd shift, while the clutch C1 is in the engaged state, the sweep-down process for the C-2 servo hydraulic pressure $P_{C2}$ is executed in the third hydraulic pressure control process. As a result, as shown in FIG. 19, the vehicle-speed line is changed toward the third speed side.

In this way, when the sweep-up process is executed on the C-1 servo hydraulic pressure $P_{C1}$ before completion of the 6th to 4th shift, the C-1 servo hydraulic pressure $P_{C1}$ is decreased slightly. In addition, after completion of the 6th to 4th shift, the C-2 servo hydraulic pressure $P_{C2}$ is decreased at the gradient ΔPC11 during the sweep-up process. As a result, shift shock is prevented.

In the case that the 6th to 3rd shift is executed in the embodiment, the 6th to 4th shift is initially executed. After the shift index value SH2 becomes larger than the threshold value SHth1 and the gear ratio Rg4 for fourth speed is established, the 4th to 3rd shift is executed. While this 4th to 3rd shift is executed, the B-1 servo hydraulic pressure $P_{B1}$ is decreased and the C-1 servo hydraulic pressure $P_{C1}$ is increased. This design prevents shift shock from occurring during the switch from the 6th to 4th shift to the 4th to 3rd shift.

In this event, due to a small gradient ΔPC2 at which the C-1 servo hydraulic pressure $P_{C1}$ is increased, shift shock is reliably inhibited.

Before increasing the C-1 servo hydraulic pressure $P_{C1}$, the sweep-up process is terminated and the final control process is started to slightly decrease the C-1 servo hydraulic pressure $P_{C1}$ so as to be just below the hydraulic pressure for engagement. This leads to shift shock being inhibited with even greater reliability.

Due to the low initial value PCn of the C-2 servo hydraulic pressure $P_{C2}$ when the C-1 servo hydraulic pressure $P_{C1}$ is increased, not only is shift shock inhibited with even greater reliability, but it is also possible to immediately change the input rotational speed Ni along with starting of the 4th to 3rd shift. Furthermore, the torque capacity of the clutch C2 is decreased while the gear ratio exceeds that for the fourth speed. Accordingly, shift shock is prevented from occurring when the clutch C1 is engaged along with starting of the 4th to 3rd shift.

The above description provides an example of the 6th to 3rd shift. A similar shift control process that only differs with respect to the engagement elements to be engaged/released is performed for a 5th to 2nd shift. In this 5th to 2nd shift in a first shift speed is a fifth speed and a second shift speed is the second speed. Three shift speeds separate the fifth speed from the second shift speed. In this case, the clutch C2 is used as a first engagement element, the clutch C3 as a second engagement element, and the clutch C1 as a third engagement element. However, in order to realize the second speed, engagement of the one-way clutch F1 serving as a fourth engagement element is required instead of engagement of the brake B1. Unlike the case of the 6th to 3rd shift, engagement of the brake B1 is not required in a 3rd to 2nd shift, which is part of the 5th to 2nd shift.

In other words, the clutches C2 and C3 are engaged in the fifth speed and the clutch C1 and the one-way clutch F1 are engaged in the second speed.

As in the case of the 6th to 3rd shift, release of the clutch C2 is started and then release of the clutch C3 is stared. Engagement of the clutch C1 is completed and then engagement of the one-way clutch F1 is completed. Release of the clutch C3 is started before engagement of the clutch C1 is completed.

In a shift from the fifth speed to the second speed, the clutches C1 and C3 are engaged to set the third speed as a third shift speed so that a 5th to 3rd downshift is executed in a first shift and then a 3rd to 2nd shift is executed in a second shift.

However, the present invention is not limited to the aforementioned embodiment, and it is contemplated that various modifications based upon the purpose of the invention may be made without departing from the spirit and scope of the invention as defined in the following claims.

What is claimed is:

1. A shift control apparatus for an automatic transmission, comprising:

a first engagement element;

a second engagement element;

a third engagement element;

a fourth engagement element; and a shift control processing unit engaging the first engagement element and engaging the second engagement element to achieve a first shift speed, engaging the third engagement element and engaging the fourth engagement element to achieve a second shift speed, starting release of the second engagement element after starting release of the first engagement element, executing to control a torque capacity of the first engagement element by feedback control and inhibiting an increase in the torque capacity of the first engagement element before starting release of the second engagement element, when shifting from the first shift speed to the second shift speed is executed.

2. The shift control apparatus for the automatic transmission according to claim 1, wherein the shift control processing unit includes a first hydraulic pressure control processing unit, said first hydraulic pressure control processing unit stopping a feedback control of a first servo hydraulic pressure in the first engagement element during a time period from starting a decrease of a second servo hydraulic pressure in the second engagement element to said starting release of the second engagement element.

3. The shift control apparatus for the automatic transmission according to claim 1, wherein the shift control processing unit includes a third hydraulic pressure control processing unit, said third hydraulic pressure control processing unit decreasing a second servo hydraulic pressure in the second engagement element to an initial value for starting engagement of the second engagement element, when the release of the second engagement element is started.

4. The shift control apparatus for the automatic transmission according to claim 3, wherein the initial value is set lower than an initial value set when shifting from a third shift speed to the second shift speed is executed during a constant speed running of a vehicle.

5. The shift control apparatus for the automatic transmission according to claim 1, wherein the shift control processing unit includes a fourth hydraulic pressure processing unit, said fourth hydraulic pressure processing unit decreasing a fourth servo hydraulic pressure to a level slightly lower than a stroke pressure for release of the fourth engagement element, after a fast-fill process is executed, and then changing the fourth servo hydraulic pressure to a piston stroke pressure, wherein said fourth servo hydraulic pressure controls engagement of the fourth engagement element.

6. The shift control apparatus for the automatic transmission according to claim 1, wherein the shift control processing unit starts the release of the second engagement element after starting release of the first engagement element, and completes engagement of the fourth engagement element after completing engagement of the third engagement element.

7. The shift control apparatus for the automatic transmission according to claim 1, wherein the shift control processing unit starts the release of the second engagement element before completion of engagement of the third engagement element.

8. The shift control apparatus for the automatic transmission according to claim 1, wherein the shift control processing unit starts the release of the second engagement element between release of the first engagement element and engagement of the third engagement element.

9. The shift control apparatus for the automatic transmission according to claim 1, wherein the shift control processing unit causes engagement of the second engagement element and engagement of the third engagement element to realize a third shift speed.

10. The shift control apparatus for the automatic transmission according to claim 1, wherein the shift control processing unit:

establishes a third shift speed between the first shift speed and the second shift speed, executes a first shift from the; first shift speed to the third shift speed, and starts the release of the second engagement element when a gear ratio of the third shift speed is established.

11. The shift control apparatus for the automatic transmission according to claim 10, wherein the shift control processing unit includes a shift index calculation processing unit that calculates a shift index value representing a progression state of shifting, and determines that the gear ratio of the third shift speed is established when the shift index value is higher than a threshold value.

12. The shift control apparatus for the automatic transmission according to claim 1, wherein the torque capacity of the first engagement element is executed by a feedback control in accordance with a target ratio of rotation change.

13. A shift control apparatus for an automatic transmission, comprising:

a first engagement element;

a second engagement element;

a third engagement element;

a fourth engagement; and a shift control processing unit engaging the first engagement element and engaging the second engagement element to achieve a first shift speed, engaging the third engagement element and engaging the fourth engagement element to achieve a second shift speed, and inhibiting an increase in torque capacity of the first engagement element before starting release of the second engagement element, when shifting from the first shift speed to the second shift speed is executed.

wherein the shift control processing unit includes a second hydraulic pressure control processing unit, said second hydraulic pressure control processing unit increasing a third servo hydraulic pressure in the third engagement element to complete engagement of the third engagement element, when a predetermined length of time has elapsed since said starting release of the second engagement element.

14. The shift control apparatus for the automatic transmission according to claim 13, wherein the second hydraulic pressure control processing unit decreases the third servo hydraulic pressure to a level lower than a hydraulic pressure allowing starting of engagement of the third engagement element, at a lime earlier than said starting release of the second engagement element by said predetermined length of time.

15. A shift control apparatus for an automatic transmission, comprising:

a first engagement element;

a second engagement element;

a third engagement element;

a fourth engagement element; and a shift control processing unit engaging the first engagement element and engaging the second engagement element to achieve a first shift speed, engaging the third engagement element and engaging the fourth engagement element to achieve a second shift speed, and inhibiting an increase in torque capacity of the first engagement element before starting release of the second engagement element, when shifting from the first shift speed to the second shift speed is executed, wherein the shift control processing unit includes a first hydraulic pressure control processing unit, said first hydraulic pressure control processing unit stopping a feedback control of a first servo hydraulic pressure in the first engagement element during a time period from starting a decrease of a second servo hydraulic pressure in the second engagement element to said starting release of the second engagement element, and wherein the shift control processing unit further includes a second hydraulic pressure control processing unit, said second hydraulic pressure control processing unit increasing a third servo hydraulic pressure in the third engagement element to complete engagement of the third engagement element, when a predetermined length of time has elapsed since said starting release of the second engagement element.

16. The shift control apparatus for the automatic transmission according to claim 15, wherein the second hydraulic pressure control processing unit decreases the third servo hydraulic pressure to a level lower than a hydraulic pressure allowing starting of engagement of the third engagement element, at a time earlier than said starting release of the second engagement element by said predetermined length of time.

* * * * *